US008583531B2

(12) United States Patent
Hirl

(10) Patent No.: US 8,583,531 B2
(45) Date of Patent: Nov. 12, 2013

(54) DECISION SUPPORT SYSTEM FOR THE MANAGEMENT OF ENERGY USE, CONTRACTING AND CAPITAL INVESTMENTS FOR FACILITIES

(76) Inventor: Joseph P. Hirl, Raleigh, NC (US)

( * ) Notice: Subject to any disclaimer, the term of this patent is extended or adjusted under 35 U.S.C. 154(b) by 0 days.

(21) Appl. No.: 13/303,209

(22) Filed: Nov. 23, 2011

(65) Prior Publication Data
US 2012/0173456 A1 Jul. 5, 2012

Related U.S. Application Data

(60) Provisional application No. 61/417,007, filed on Nov. 24, 2010.

(51) Int. Cl.
*G06Q 40/00* (2012.01)
(52) U.S. Cl.
USPC .......................................... 705/36 R; 705/35
(58) Field of Classification Search
USPC ....................................................... 705/36 R
See application file for complete search history.

(56) References Cited

U.S. PATENT DOCUMENTS

| 8,155,900 | B1* | 4/2012 | Adams | 702/62 |
| 2004/0163396 | A1* | 8/2004 | Starling et al. | 62/127 |
| 2004/0267408 | A1* | 12/2004 | Kramer | 700/291 |
| 2005/0102068 | A1* | 5/2005 | Pimputkar et al. | 700/291 |
| 2006/0241905 | A1* | 10/2006 | McCalla | 702/182 |
| 2007/0255461 | A1* | 11/2007 | Brickfield et al. | 700/295 |
| 2008/0082183 | A1* | 4/2008 | Judge | 700/33 |
| 2009/0254225 | A1* | 10/2009 | Boucher et al. | 700/295 |
| 2010/0057416 | A1* | 3/2010 | Peterman et al. | 703/6 |
| 2012/0271469 | A9* | 10/2012 | Masters et al. | 700/292 |

FOREIGN PATENT DOCUMENTS

| JP | 2001-065959 A | 3/2001 |
| JP | 2001-338036 A | 12/2001 |
| KR | 10-2009-0033299 A | 4/2009 |
| KR | 10-2010-0089594 A | 8/2010 |
| KR | 10-2010-0117409 A | 11/2010 |

OTHER PUBLICATIONS

Drury B. Crawley, Contrasting the capabilities of building energy performance simulation programs, Building and Environment 43 (2008) 661-673.*

(Continued)

*Primary Examiner* — Hani M Kazimi
*Assistant Examiner* — Chuks Onyezia
(74) *Attorney, Agent, or Firm* — Olive Law Group, PLLC

(57) ABSTRACT

Disclosed herein is an energy management decision support system and methods for asset managers of buildings and facilities that can utilize energy usage data captured from meters, such as smart meters, and weather data to provide a systems-based cost reduction and optimization solution for end users. Building system components may be highly interdependent and changes to one system element can have substantial effects (positive and negative) upon other system elements. As described in further detail herein, system and method embodiments according to the present disclosure may apply predefined criteria to such building energy usage data to identify energy usage variances, and may graphically present to a user the identified energy usage variances. As a result, facility administrators are provided with more easily interpretable energy usage information. Such information may be applied by the administrators for adjusting operations, upgrading building equipment, or retrofitting building equipment to improve building efficiency.

22 Claims, 24 Drawing Sheets

(56) References Cited

OTHER PUBLICATIONS

Xiaofan Jiang, Experiences with a High-Fidelity Wireless Building Energy Auditing Network, SenSys 2009 Proceedings of the 7th ACM Conference on Embedded Networked Sensor Systems pp. 113-126.*

Guinard, Antony, Alan McGibney, and Dirk Pesch. "A wireless sensor network design tool to support building energy management." Proceedings of the First ACM Workshop on Embedded Sensing Systems for Energy-Efficiency in Buildings. ACM, 2009.*

Written Opinion and International Search Report for corresponding PCT application No. PCT/US11/61989 filed Nov. 23, 2011; Self Benchmarking Diagnostic Tools and Virtual Building Tools.

* cited by examiner

DECISION SUPPORT SYSTEM FOR THE MANAGEMENT OF ENERGY USE, CONTRACTING AND CAPITAL INVESTMENTS FOR FACILITIES

CROSS REFERENCE TO RELATED APPLICATION

This application claims the benefit of U.S. provisional patent application Ser. No. 61/417,007, filed Nov. 24, 2010; the disclosure of which is incorporated herein by reference in its entirety.

TECHNICAL FIELD

The presently disclosed subject matter provides a comprehensive and interdependent system of evaluation of historic and predicted energy use, costs associated with energy use and risk adjusted economic impacts from facility equipment upgrades and/or replacements to support management operational and capital investment decisions designed to optimize facility performance.

BACKGROUND

Energy management is critical for environmentally conscious, cost-effective operation of buildings and facilities where, for example, central heating, ventilating and air conditioning (HVAC) and various other facilities' equipment may be used. There are a wide range of building management systems that exist today that can provide facility operations staff with individual equipment control and information on real-time operational status of equipment and short interval energy usage.

However, energy use and equipment information is most frequently provided in such a way that critical information, including systemic operational and cost issues, is not evaluated and presented in a manner easily interpretable by operations staff and management. Consequently, operations staff and management are not able to comprehensively identify issues that reoccur under similar conditions and make appropriate corrective decisions regarding equipment control, maintenance and equipment investments. Given a lack of comprehensive decision support tools, staff are also unable to determine the effects of suboptimal performance on power contracting and regulated utility tariffs. Accordingly, there is a need for improved energy management decision support systems and techniques for operators and management that account for the interdependencies between operations, power contracting/tariff optimization, and capital equipment improvements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are energy management decision support systems and methods for buildings and facilities that can utilize energy usage data captured from meters, such as smart meters, and weather data to provide a systems-based cost reduction and optimization solution for end users. Building system components may be highly inter-dependent and changes to one system element can have substantial effects (positive and negative) upon other system elements. As described in further detail herein, system and method embodiments according to the present disclosure may apply predefined criteria to such building energy usage data to identify energy usage variances, and may graphically present to a user the identified energy usage variances. As a result, facility administrators are provided with more easily interpretable energy usage information. Such information may be applied by the administrators for adjusting operations, upgrading building equipment, or retrofitting building equipment to improve building energy usage.

In accordance with embodiments of the present disclosure, an example method is provided for assessing performance of a building and for providing an operation and financial decision support system. The method includes receiving time-based energy use, weather, cost, and operations data associated with the building. The method also includes analyzing the data for consistency and continuity across a time interval. Further, the method includes interpolating time-based polynomial equations derived from the energy use and weather data to generate a completed data set from the received data. The method also includes performing multiple, dynamic matrixed data processes to identify and prioritize by cost and frequency, operational periods, weather conditions, and equipment configurations that result in inefficient and costly operations. Further, the method includes generating a dynamic, user-controlled multi-variate and relational visualization feedback interface based on the data and the building model for indicating patterns of suboptimal and costly performance. The method also includes presenting to an operator at least one recommendation based on the data and the building model for improving building performance through one or more actions.

In accordance with other embodiments of the present disclosure, a method is disclosed for simulating energy use associated with a building to test one or more actions for implementation by an operator in order to test the economic effects of changes to proposed building operations and capital equipment investment. The method includes generating derived polynomial equations using time-based forecast data grouped by clustering techniques for meeting a fit and minimal variance criteria. Further, the method includes determining a statistical distribution of residual variance from observed conditions for each derived polynomial equation. The method also includes estimating static efficiency and performance improvement effects from changes to one of operations and equipment of a building model. Further, the method includes incorporating proposed building operations and equipment change estimates into a simulation process using the derived polynomial equations and residual variance distributions for comparing economic range of the effects and risk of proposed changes to equipment investment in a building associated with the building model. The method also includes presenting to an operator prioritized investment recommendations based on economic returns and resultant variability risk data produced by the simulation process.

In accordance with other embodiments of the present disclosure, a method is disclosed for providing a model of an actual building and associated predicted building energy usage. For example, a suitable computer may include an application configured to model the building and predicted building energy usage. The method may also include receiving data indicating actual building energy usage and weather associated with the actual building energy usage for the actual building. Further, the method may include determining variances between the actual building energy usage and predicted building energy usage. The model may be used to simulate changes to building operation and/or building equipment of the actual building based on the variances for determining a probability adjusted outcome of building energy used and costs. The method may also include presenting to a user the probability adjusted outcome of building energy used and costs of changing the building operation and/or building equipment.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
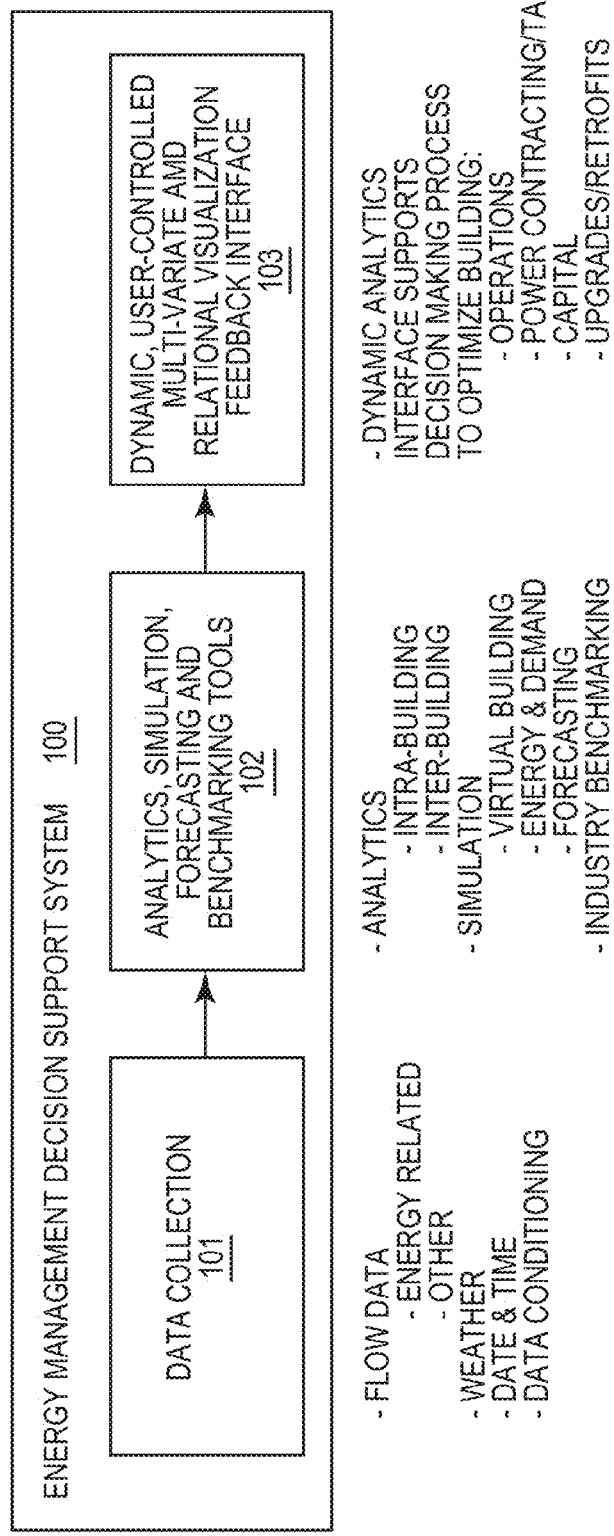
FIG. 1 is a block diagram of an energy management decision system according to embodiments of the present disclosure.

The presently disclosed subject matter is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present energy management decision support system (DSS) disclosure include: 1) data collection tools and methods; 2) analytics, simulation, forecasting and self benchmarking tools; and 3) dynamic, visual multi-variate user interfaces that may be used by building and facility administrators to identify issues and opportunities within operations, power contracting, tariff optimization, and probability-adjusted, return-based upgrades and retrofits. By use of these tools, administrators may evaluate building performance holistically and arrive at informed decisions that optimally improve building energy performance by reducing usage, lowering costs, and enhancing sustainability.

The energy management decision support system and associated tools disclosed herein can be implemented by a suitable computer and can be used to identify patterns and variances in energy usage and demand. The tools can compare these patterns and variances with building performance under similar conditions as well as other buildings within the same industry and/or configuration.

The virtual building (simulation) tool can be implemented by a suitable computer and can mathematically model an actual building for testing the building under a range of seasonal, monthly, day of week, time of day, and weather parameters. The behavior may be modeled as multiple probability distributions tied to weather characteristics and historical energy usage and demand. With generation of a base virtual building model that responds similarly to the actual building, changes can then be made to the existing equipment configuration with the benefits claimed by vendors tested against the actual building to determine effects on costs and a probability adjusted, cash based net present value. This valuation and its riskiness (e.g., variability) can be ranked among alternatives to prioritize a building investment plan. Effects to changes to equipment can also be applied to a power procurement strategy, tariff optimization and potential changes to operations.

The virtual building (simulation) tool can also be used to forecast energy use and demand over the range of long term weather forecasts provided by official and private sources. As an example, the U.S. National Weather Service provides a continually updated 7-day weather forecast over a range of parameters. The virtual building tool built from algorithms that accurately predict energy and demand levels based on weather conditions can continuously generate, for example, 7-day forecasts of energy use and demand for a building. Building operators and administrators can use this energy forecasting to plan operations, maintenance and identify predicted "problem" days of high use or variance and take pre-emptive action to avoid adverse energy use and cost consequences.

FIG. 1 illustrates a block diagram of an energy management DSS 100 according to embodiments of the present disclosure. Referring to FIG. 1, the system 100 includes data collection and conditioning functions 101, analytics, simulation, forecasting and benchmarking tools 102, and dynamic, user-controlled multi-variate and relational visualization feedback interfaces 103 in accordance with embodiments disclosed herein. The components of the system 100 may be implemented by suitable hardware, software, and/or firmware. For example, the system components may be implemented by a processor and memory. The system 100 may use data, such as weather data (e.g., weather data retrieved from a local airport) and energy usage interval data (e.g., energy data retrieved from one or more smart meters). In an example, the energy usage interval data may be suitably transmitted to the system 100 by one or more smart meters residing within, on, and/or near a building. Industry benchmark data may also be used by tools 102 as described in more detail herein. These tools and information may be processed and presented in the interface 103 as described herein for use by building and facility administrators to identify issues and opportunities within operations, power procurement, tariffs, and equipment upgrades and retrofits for improving energy usage. The elements of the system 100 are disclosed in more detail herein below.

Data Collection

Data collection and conditioning processes are disclosed herein for providing inputs for the energy management DSS and can be important for deriving useful and accurate analytics and dynamic visual feedback to a user via the interface 103. Data may be collected from a range of sources including the Internet, from one or more smart meters, and/or other suitable sources, and subsequently matched for date and time. Data collected from meters and from weather sources may have discrepancies and missing elements. In the case of discrepancies and missing elements, the data may be conditioned 200 as shown in the example method of data collection shown in FIG. 2 in order to ensure complete consistency and continuity for all time series data over the full time interval. Once the data is conditioned and complete, the data may be imported into an electronic relational database.

Figure 2:
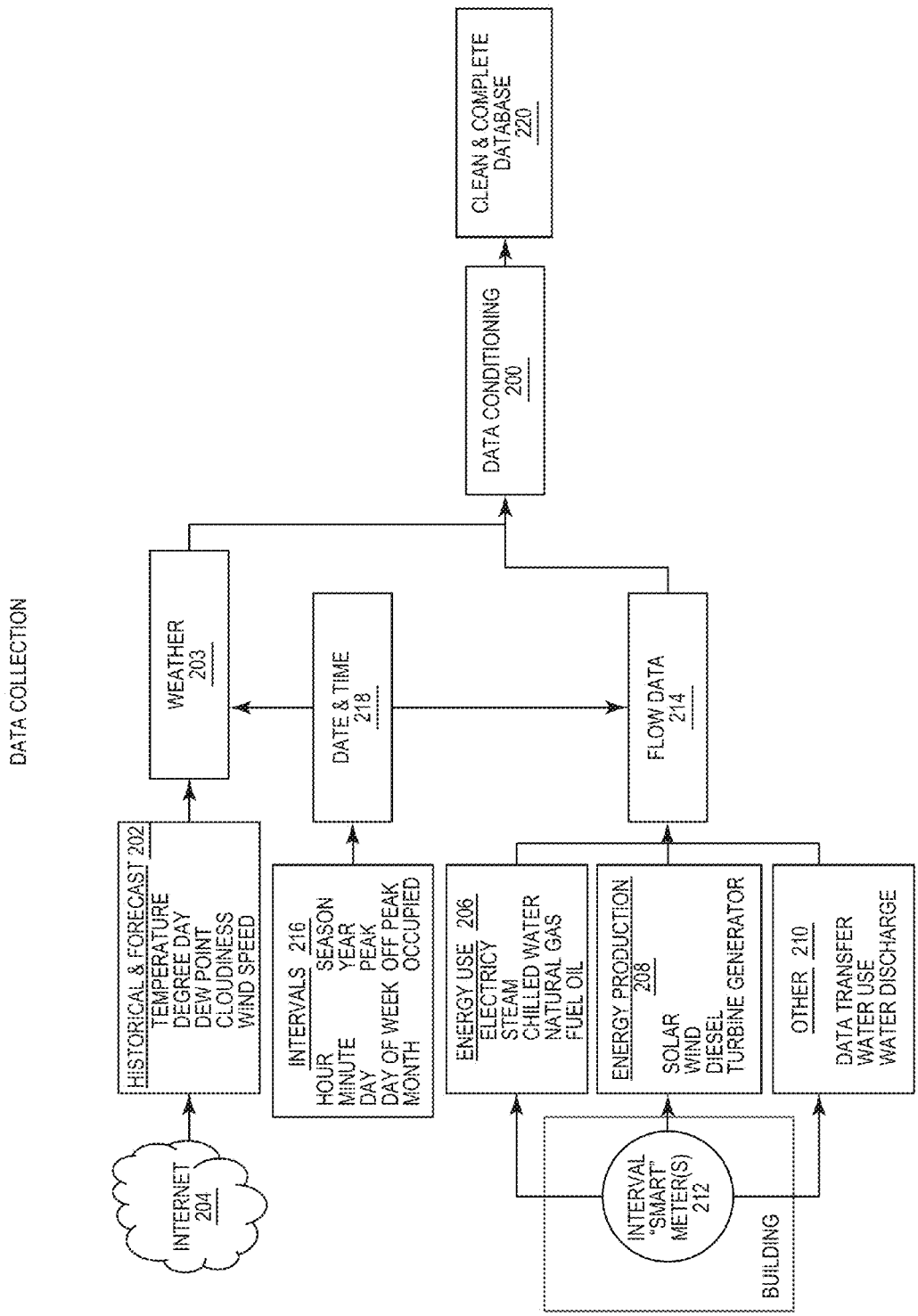
FIG. 2 is a flow chart of an example method of data collection according to the embodiments of the present disclosure.

The steps of FIG. 2 may be implemented by the data collection and conditioning functions 101 shown in FIG. 1. Referring to the example of FIG. 2, various historical and forecast weather data 202 including, but not limited to temperature, degree day, dew point, cloudiness, wind speed, or other weather historical and forecast data, may be collected from the Internet 204 and/or other sources, and subsequently compiled into a weather data collection 203. Further, energy use data 206, energy production data 208, and other various data 210 may be collected from one or more smart meters 212. Example energy use data includes, but is not limited to, electricity, steam, chilled water, natural gas, fuel oil data and the like. Example energy production data includes, but is not limited to, solar, wind, diesel, turbine generator, and the like. Various other example data includes, but is not limited to, data transfer, water use, water discharge data, and the like. Such data may be compiled into a flow data collection 214. The various data may be collected at suitable intervals 216 and date and time information 218 may be used to match the weather data 203 and the flow data 214. Interval data is tagged with other interval information including, but not limited to, hour, minute, day, day of week, month, season, year, utility-defined peak and off-peak periods and building specific occupied and unoccupied periods. Subsequently, the data may be conditioned 200 to provide a clean and complete relational database 220.

Figure 3:
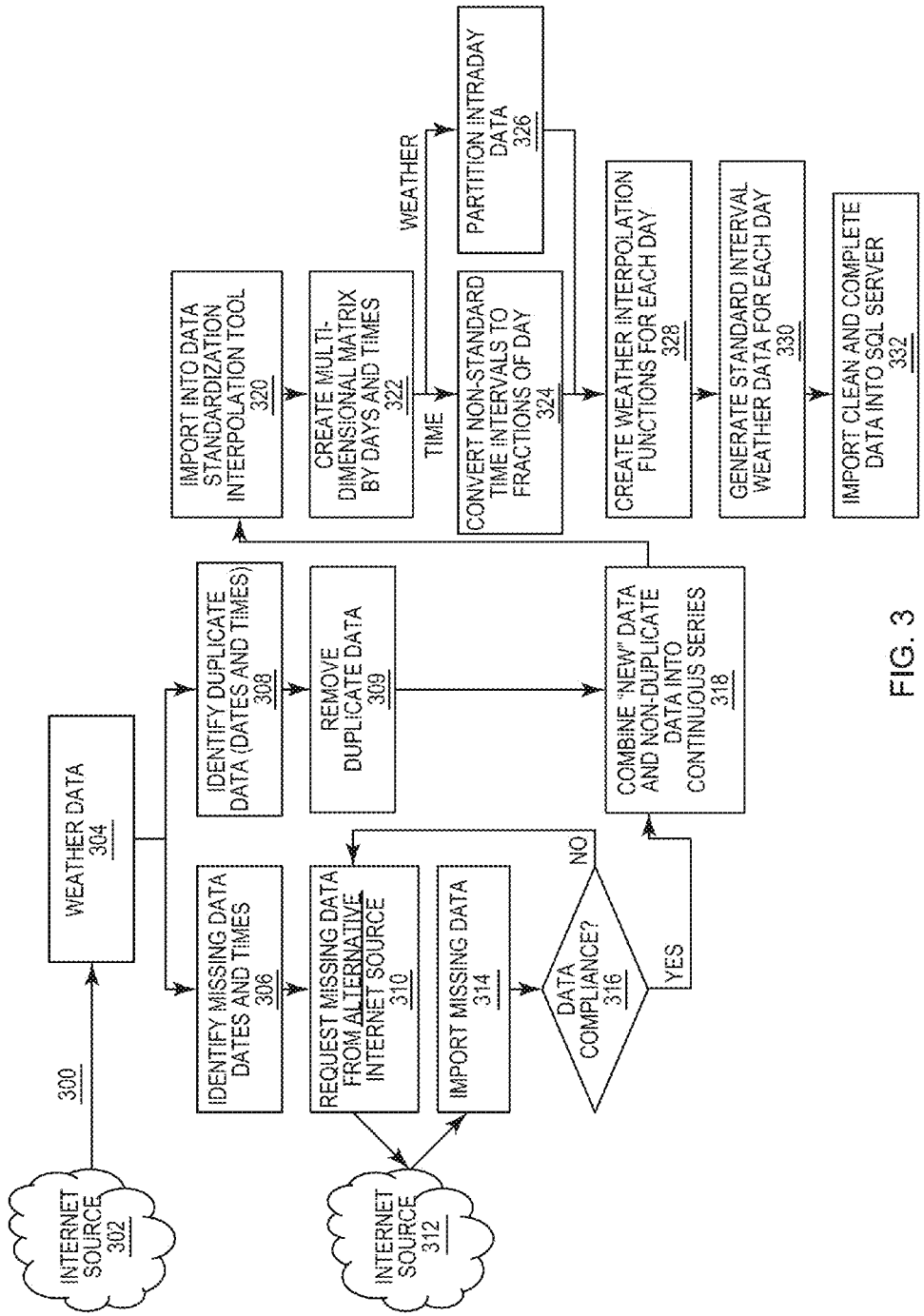
FIG. 3 is a flow chart of an example method of a weather data collection and conditioning process according to embodiments of the present disclosure.

FIG. 3 illustrates a flow chart of an example method of a weather data collection and conditioning process according to embodiments of the present disclosure. The method may be implemented by the data collection processes 101 of the system 100 shown in FIG. 1, and may be a subset of the data conditioning step 200 shown in FIG. 2. Referring to FIG. 3, in an initial step 300 of interval and data selection, a user may use a computer for selecting a closest airport or other weather information source based on the location of a building and the period of available energy meter data. The user may also select a desired time interval and type of weather data. In addition, the user may specify the minimum number of daily measurement points. Such selections or other user inputs may be made via a suitable user interface (e.g., a keyboard, mouse, display, and the like). Also, at step 300 of FIG. 3, the Internet-based weather database at an Internet source 302 may be queried and weather data 304 imported into a matrixed database. The weather data 304 may include, for example, temperature data.

Data Conditioning—Weather

At steps 306 and 308 of FIG. 3, the imported weather data may be tested and flagged for missing and/or duplicated entrees. For example, at step 306, missing data (e.g., dates and times) may be identified. Further, at step 308, duplicate data (e.g., dates and times) may be identified, and the duplicate data removed 309 from the original database of imported weather data. At step 310 of FIG. 3, a missing data request may be transmitted to alternative Internet-based weather sources 312. For example, the data request may be sent to weather stations geographically situated near the principal airport-based weather station initially queried for supplemental data. In step 314 and 316, the missing data is retrieved, imported, and retested to determine whether the data is complete and continuous. In response to determining that the data is not complete, the process may return to step 310 for attempting another data request for the missing data. In response to determining that the data is complete, the process may proceed to step 318, which includes combining the new data from sources 312 and the non-duplicate data into a continuous series. For example, at step 318, non-duplicate data from the initial query, additional data from alternative Internet-based sources may be combined into a new and complete weather database.

Once the weather data set is complete through step 318 of FIG. 3, the data conditioning process can generate daily weather functions to create a new database where weather data can be exactly matched with the same intervals of flow data retrieved during the data collection processes 101 described with respect to FIG. 1.

At step 320 of FIG. 3, cleaned and complete one-dimensional weather data may be imported that resulted from the previous steps of FIG. 3. In step 322 of FIG. 3, the data may be converted into a multi-dimensional matrix where data is grouped by days.

At step 324 of FIG. 3, the time of each daily data point may be converted to a fraction of the day (e.g., noon is 0.5) for each day. The times (with weather data) may not be the same for every day. The fractional divisions for each day may be stored in a matrix. Also at step 326 of FIG. 3, weather data may be separated from the original matrix and grouped by day.

At step 328 of FIG. 3, multi-polynomial weather interpolation functions may then be created for each day with the dependent variable being the weather value and the independent variable being the fraction of the 24-hour day. The result is that the weather path for each day is now represented by a series of unique functions that pass through each actual measured point for each day. It is noted that operations may now be performed on the daily weather functions (e.g., integration, derivation, interpolation, and the like) for evaluating separately manipulated energy data.

In step 330 of FIG. 3, the weather data (e.g., temperature) may then be converted to a differential form, for example, with 65° F. as the reference point (which is the convention). For days with temperatures above 65° F., cooling may be required, whereas temperatures below 65° F. may generally require some heating. Also, at step 330 of FIG. 3, the weather functions (e.g. temperature) may then be integrated to determine the fractional degree day (area under functional curve) at 15 minute intervals or any other suitable interval. Subsequently, clean and complete data may be imported into an SQL server (step 332).

An example purpose of this method is to match temperature and fractional degree days sourced from reliable sources (e.g., airport weather stations) with interval (15 minute interval) energy data recordings when the temperature is not in the same form or on the same intervals as the energy measurements.

Data Conditioning—Flow Data

Figure 4:
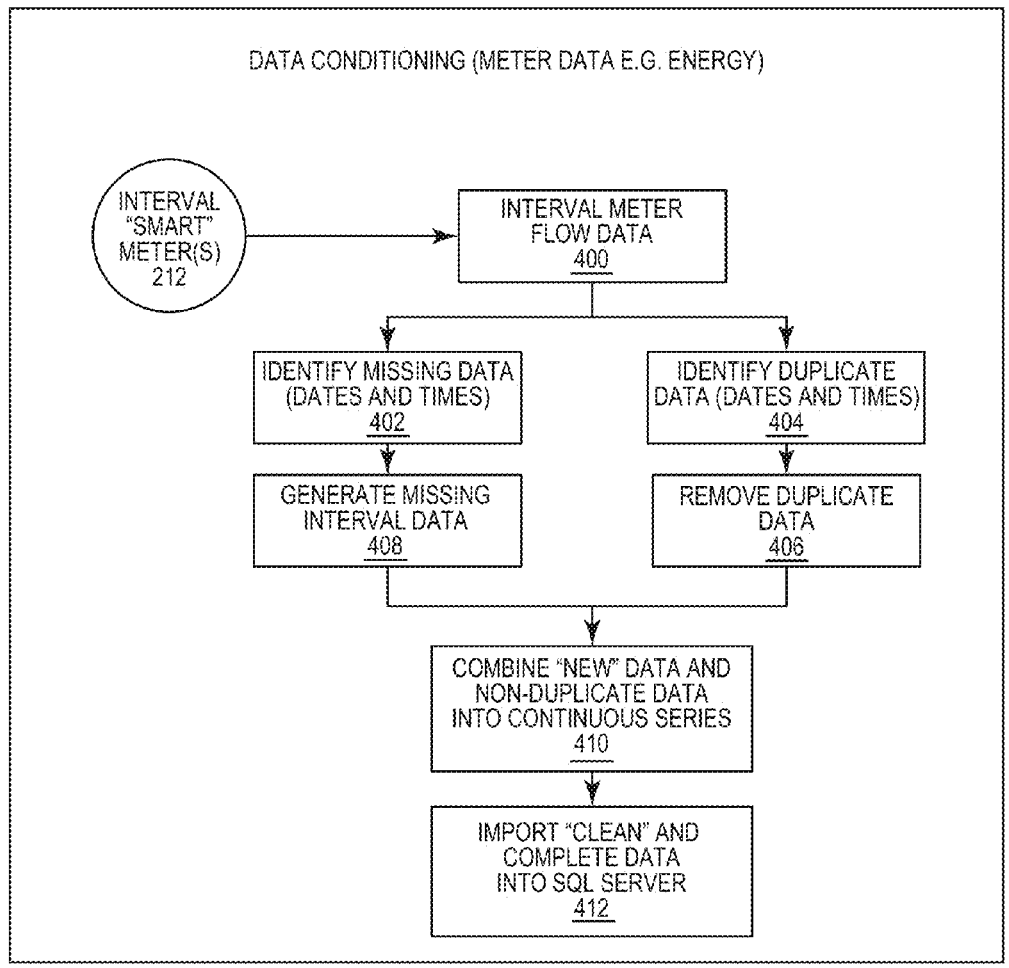
FIG. 4 is a flow chart of an example method of conditioning and ensuring completeness of collected flow data.

FIG. 4 illustrates a flow chart of an example method of conditioning and ensuring completeness of collected flow data according to embodiments of the present disclosure. The method may be implemented by the data collection processes 101 of the system 100 shown in FIG. 1, and may be a subset of the data conditioning step 200 shown in FIG. 2. Referring to FIG. 4, at step 400, interval flow meter (e.g. energy) data is imported into a matrixed database. The data may be received from one or more smart meters 212. If more than one interval flow meter exists at a facility, the data may be defined by a meter so that it may later by compared in aggregate and separately.

Subsequently, the imported and matrixed database of interval flow data is tested and flagged for missing data (step 402) and duplicate entries (step 404). Subsequently, the duplicated data is cleansed from the database (step 406) and missing data is generated (step 408) if the interval between observed data points is less than, for example, two hours. If the gap between observed flow data measurements is greater than two hours, then integers are substituted for the missing points at zero or greater value depending on the base energy demand levels.

At step 410 of FIG. 4, non-duplicate data from the initial query, and additional generated data are combined into a new and complete flow data database. At step 412, the complete and continuous flow data series may be imported into a SQL server database.

Analytics, Simulation, Forecasting and Benchmarking Tools

System and method embodiments are disclosed that provide energy management tools for building and facility administrators. Generally, in one or more embodiments of the present disclosure, a system can implement a step of receiving building energy usage data. For example, a meter may be used for obtaining building energy usage data over a period of time. The system may also apply predefined criteria to the building energy usage data to identify energy usage variances. Further, the system may include a dynamic user interface including, but not limited to, a display for graphically presenting to a user the identified energy usage variances. For example, the received building energy usage data may indicate a day and time of day when the energy usage data was captured. Further, in this example, the system may display a multi-dimensional surface plot having axes corresponding to the day, the time of day, and energy usage associated with the day and time of day.

Energy Demand Visualization and Temperature Heat Map

Figure 5:
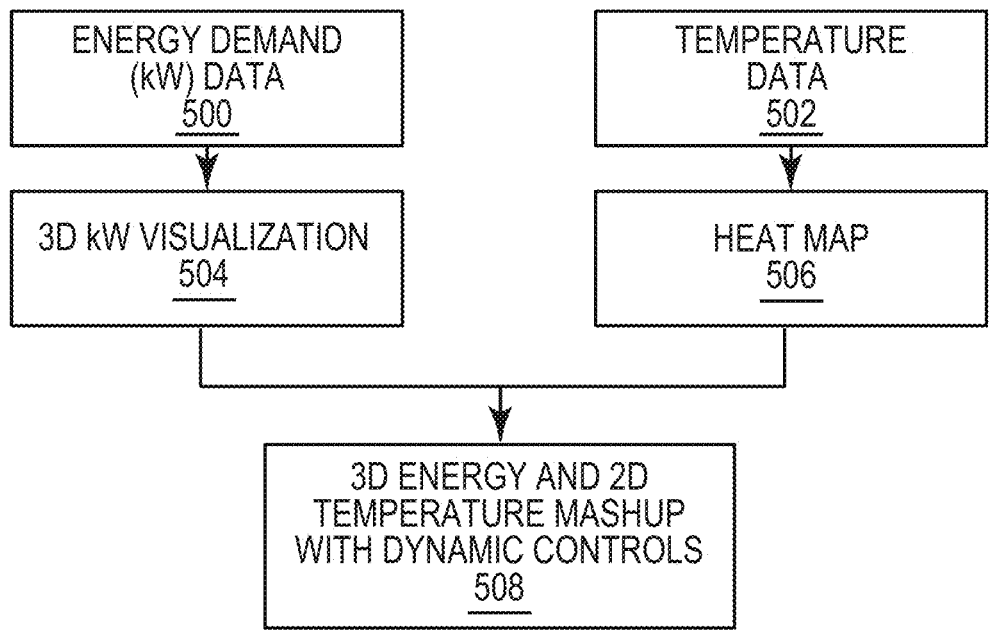
FIG. 5 is a flow chart of an example method for presenting an energy demand and temperature heat map data according to embodiments of the present disclosure.

The analytics, simulation, forecasting and benchmarking tools 102 of the energy management DSS 100 shown in FIG. 1 may present to a user energy, date, time and weather data. For example, FIG. 5 is a flow chart of an example method for presenting energy demand and temperature heat map data according to embodiments of the present disclosure. Referring to FIG. 5, initially, energy data (step 500) and temperature data (step 502) organized into multidimensional matrices (as per previous processes) may be imported into a three-dimensional (3D) visualizer and dynamic user interface.

At step 504 of FIG. 5, a 3D surface plot may be created with axes identified as Date (y), Time of Day (x) and kW (z) (or other suitable flow data such as kBtus). The organization of the data and 3D representation allows for identification of desirable/undesirable patterns of use where the building's energy use differs from other similar periods. Given use profiles typical for the industry, differences can also be determined. The relative values of kW (z axis) may be color coded to more quickly and accurately compare intraday and across days, months and seasons.

At step 506 of FIG. 5, interpolated interval (e.g., 15 minute) temperature data may be transformed into a two-dimensional (2D) heat map with the highest values red and the lowest values blue and values in between represented as a proportional spectrum between the two colors. Colors can change intraday depending on the interpolated temperature data and across days. The relative values and colors may be consistently applied across the full time period (e.g., a year in most examples) so that a 60° F. temperature, for example, is the same color across the full time range.

At step 508 of FIG. 5, the 3D and 2D plot may be combined in a mashup so that changes in energy demand can be compared with relative temperature as the plots are aligned in 3D space. In an example, the dynamic user interface controls allow for rotating the mashup in 3D space to evaluate demand and temperature effects from all possible perspectives. In another example, the interface may also allow for the full date range to be dynamically adjusted to focus on the full range, a month, week or a single day. The hours of the day can also be adjusted so that, for example, the first 6 hours of the day can be more closely evaluated, or the midday or last part of the day. In another example, opacity of the 3D plot can be adjusted so that the 2D heat map is more visible and more detailed evaluations can be made across demand and temperature. In another example, date and time can be adjusted together, and this feature may be a zoom-in/zoom-out type of feature. In another example, individual days of the week can be selected such that, for example, weekend days can be compared in isolation from weekdays. In another example, relative colors may adjust automatically depending on the date and time ranges selected. The colors may adjust to the new, adjusted set of data.

In yet another example, as a facility may have more than one interval flow meter, individual meters may be toggled on and off so that the data can be looked at in aggregate or by meter. Individual meters can also be compared to each other where the 3D representation shows multiple 3D surface plots corresponding to each meter. This way the relative values of each meter over time and temperature can be compared and conclusions drawn due to their positioning. When meters are plotted separately and against each other they are coded by a single distinct color.

In another example, a comparison plane can also be created that plots a single horizontal plane at a user defined level. The plan is semi-transparent so the user can determine the periods above and below this level to understand the frequency and conditions of high and low levels of energy use.

Figure 6:
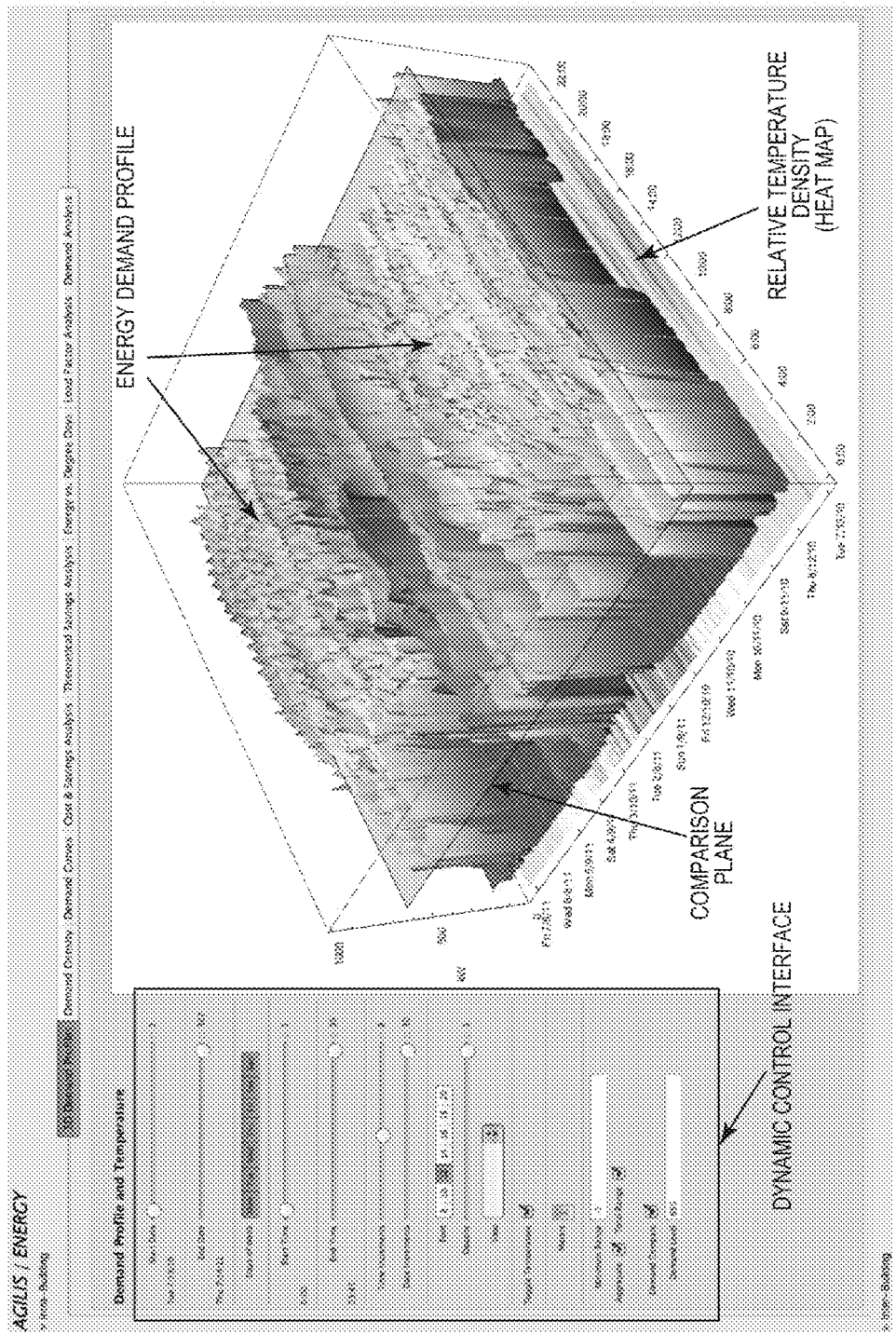
FIG. 6 is a display screen showing a dynamic user interface that includes an example 3D and 2D graphical representation of identified energy usage variances according to embodiments of the present disclosure.

FIG. 6 depicts a screen display of a dynamic user interface that includes an example graphical representation of identified energy usage variances according to embodiments of the present disclosure. Referring to FIG. 6, the graphic depicts a three-dimensional surface plot having axes corresponding to day, time of day, and energy usage associated with the day and time of day. The graphic also depicts an energy demand profile of a building. Further, the interface shows a dynamic control interface, comparison plane, and a relative temperature density (heat map).

2D Energy Density (Heat Map) Visualization

Figure 7:
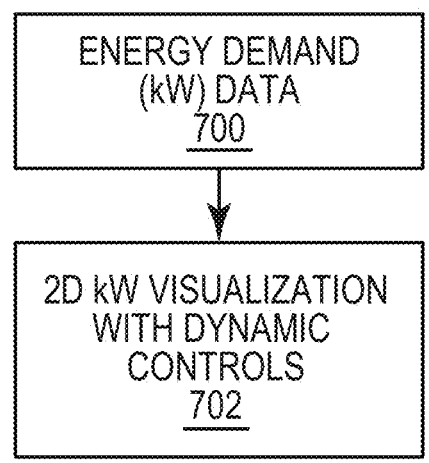
FIG. 7 is a flow chart of an example method for visualization of 2D energy density (heat map) according to embodiments of the present disclosure.

The analytics, simulation, forecasting and benchmarking tools 102 of the energy management DSS 100 shown in FIG. 1 may present to a user visualization of 2D energy density (heat map). For example, FIG. 7 is a flow chart of an example method for visualization of 2D energy density (heat map) according to embodiments of the present disclosure. Referring to FIG. 7, in an initial step 700, energy and temperature data organized into multidimensional matrices (as per previous processes) may be imported into a dynamic user interface and 2D visualizer.

Figure 8:
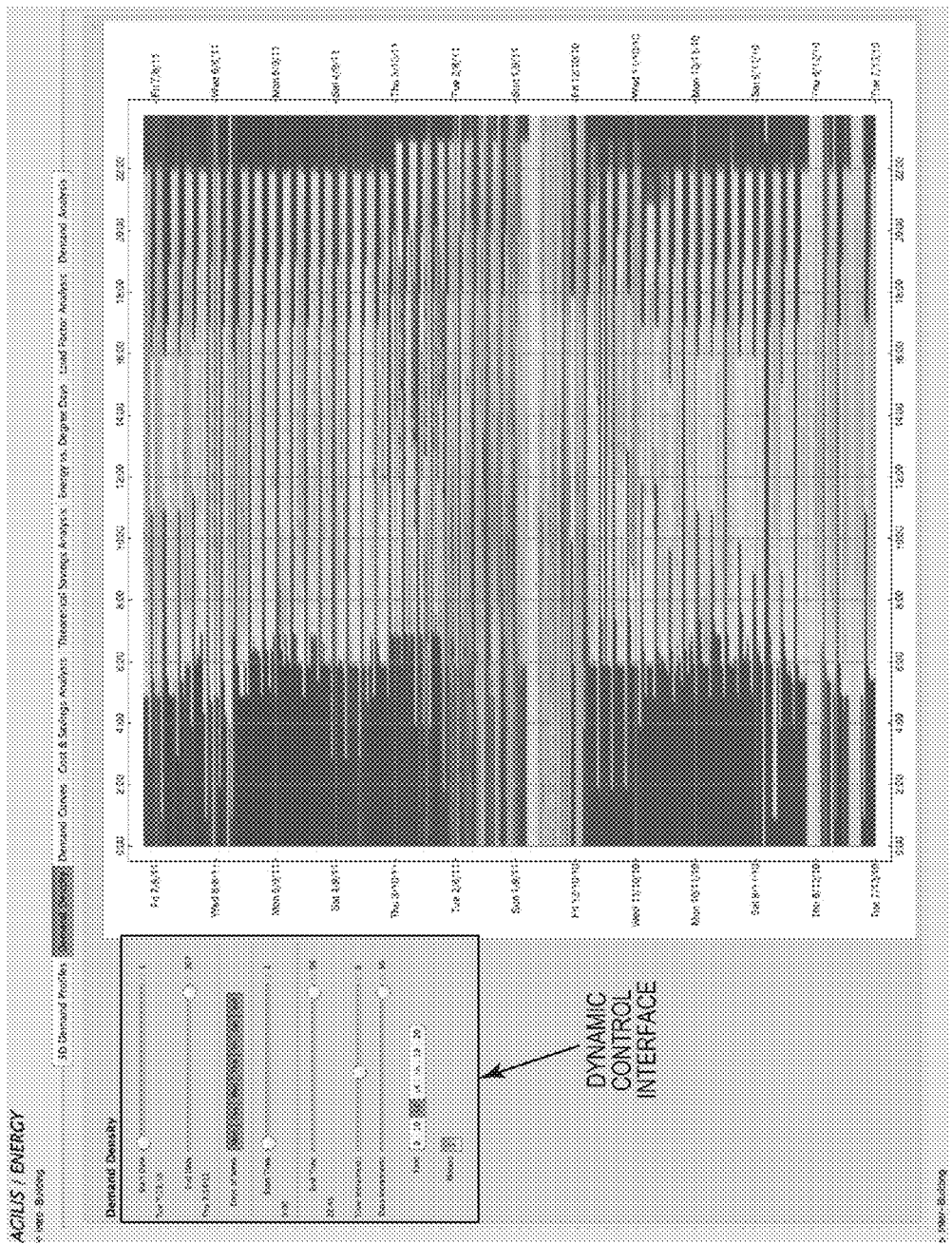
FIG. 8 is a screen display of a dynamic user interface that includes an example graphical 2D representation of relative energy demand according to embodiments of the present disclosure.

At step 702 of FIG. 7, the relative energy demand values are color coded as with the kW (z values) for the 3D visualization. For example, FIG. 8 depicts a screen display of a dynamic user interface that includes an example graphical representation of relative energy demand according to embodiments of the present disclosure. This representation provides more precise clues as to changing daily schedules and startups and how consistent and disciplined the building management team is in managing equipment.

The screen display of FIG. 8 also shows a dynamic control interface. For example, the interface may be interacted with by a user to dynamically adjust the date range and time of day to allow for more precise inspection of energy use. This feature is a zoom-in/zoom-out type of feature. If there are multiple interval flow meters at a facility, the user can select whether the data is to be evaluated in aggregate or by individual meter.

Daily Usage Profile Tool

Figure 9:
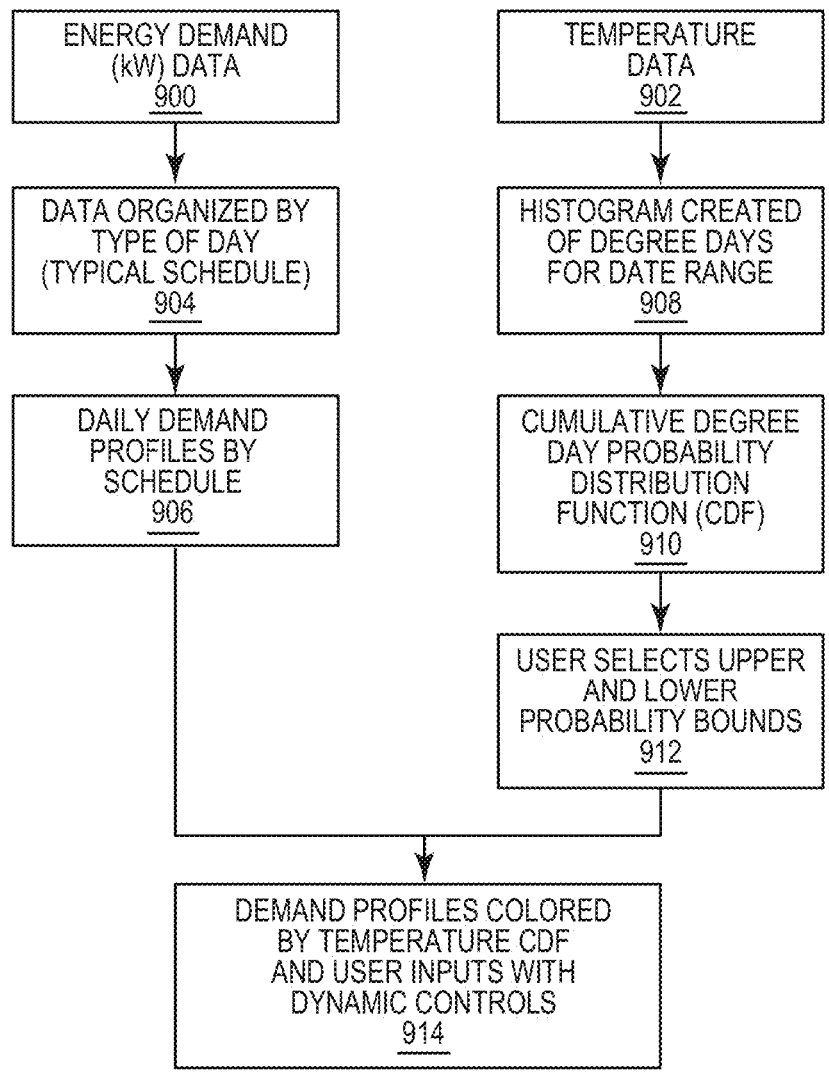
FIG. 9 is a flow chart of an example method for presenting multiple daily usage profiles for a building according to embodiments of the present disclosure.

The analytics, simulation, forecasting and benchmarking tools 102 of the energy management DSS 100 shown in FIG. 1 may present to a user a daily usage profile for a building. For example, FIG. 9 illustrates a flow chart of an example method for presenting multiple daily usage profiles for a building according to embodiments of the present disclosure. Referring to FIG. 9, energy data (step 900) and temperature data (step 902) organized into multidimensional matrices (as per previous processes) may be imported.

At step 904 of FIG. 9, daily demand (kW) profiles (intraday) may be organized by "schedules" unique to the particular industry sector. For example, commercial office building equipment and tenant use patterns typically follow four (4) separate schedules: Mondays, Tuesdays-Fridays, Saturdays and Sundays. At step 906 of FIG. 9, in the representation for Mondays, all Monday daily profiles for the date range may be shown overlaid on a single graph.

At step 908 of FIG. 9, total daily degree days as calculated in the previously discussed temperature and function processes, may be binned into a statistical histogram for the defined date range. Particularly, the bin range (e.g., 10 degree days) can be established since building behavior (e.g. energy use) changes with increasing or decreasing ambient air temperature.

At step 910 of FIG. 9, a cumulative degree day probability function (CDF) may be created based on the distribution of binned degree days in the histogram.

At step 912 of FIG. 9, a user may dynamically select the comparison confidence levels (probability bounds). For example, if the user would like to isolate (by color) the 10% hottest days and the 10% coldest days, the tool will adjust the coloring (discussed in next step). The user may, for example, select any probability band between >0 and 1.

At step 914 of FIG. 9, within each of the different schedules (and graphical representations), the color of the daily demand profiles can change based on the user's input for degree day comparison. Those days (across all schedules) that are above the upper probability are colored red (hottest). Those days (also across all schedules) that are below the lower probability are colored blue (coldest). The days between the lower and upper probability bands are colored green. As with the previous tools, the user can dynamically adjust the date range. The degree day histogram will also change with a modified date range to accurately represent the "new" distribution of daily degree days. For each defined schedule and the user adjusted time interval, maximum and minimum degree days are shown to illustrate the temperature range. If there are multiple interval flow meters at a facility, the user can select whether the data is to be evaluated in aggregate or by individual meter.

Figure 10:
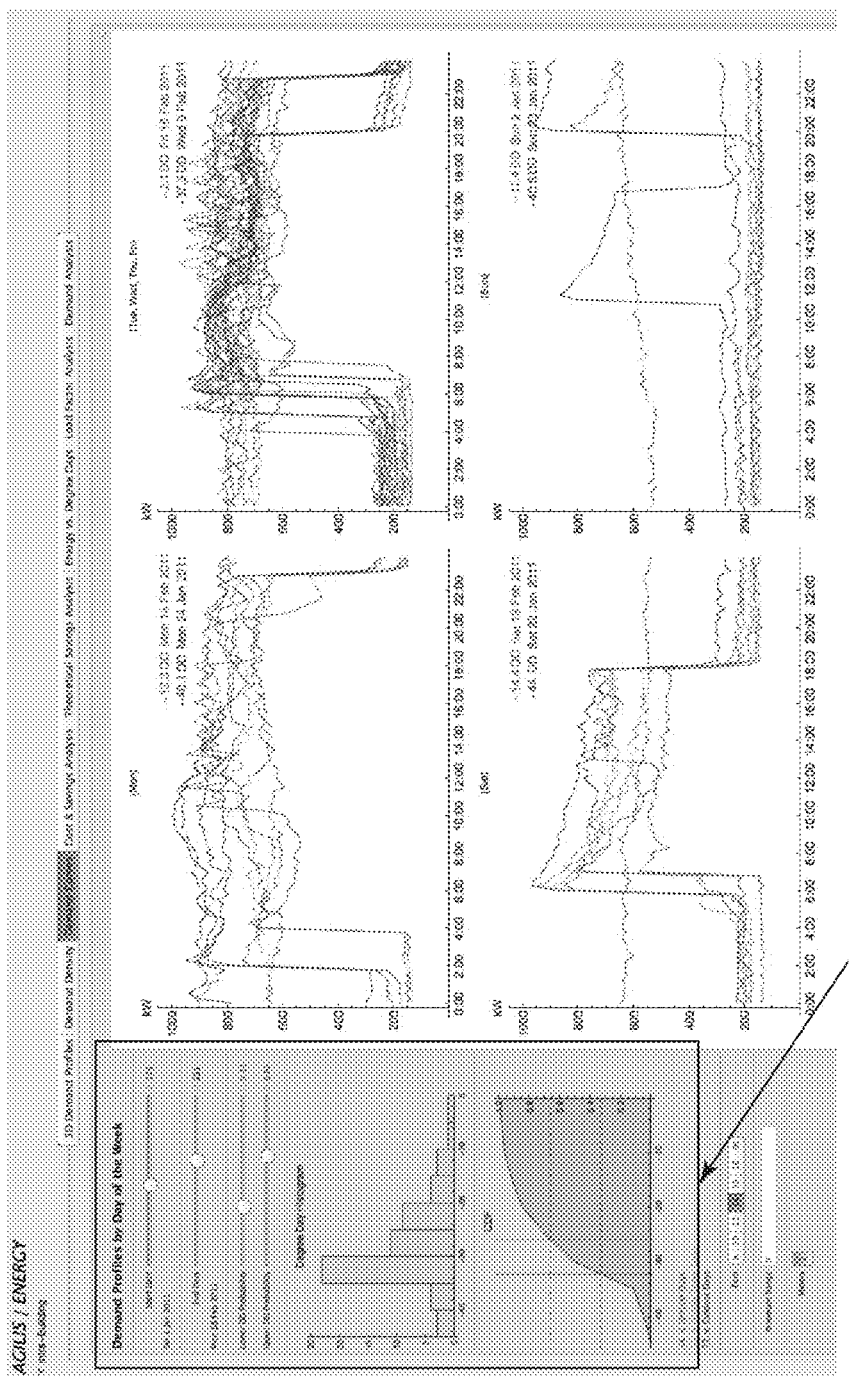
FIG. 10 is a screen display of a dynamic user interface showing an example graphical representation of daily profiles by day of week according to embodiments of the present disclosure.

This tool allows for the building to be compared with itself (self benchmarked) under similar conditions (schedules and degree days). The user is able to determine desirable/undesirable patterns and variances based on actual building performance and when compared with similar industry facilities. For example, FIG. 10 depicts a screen display of a dynamic user interface showing an example graphical representation of daily profiles by day of week according to embodiments of the present disclosure. The screen display of FIG. 10 also shows a dynamic control interface for interaction by a user.

Cost and Savings Potential Tool

Figure 11:
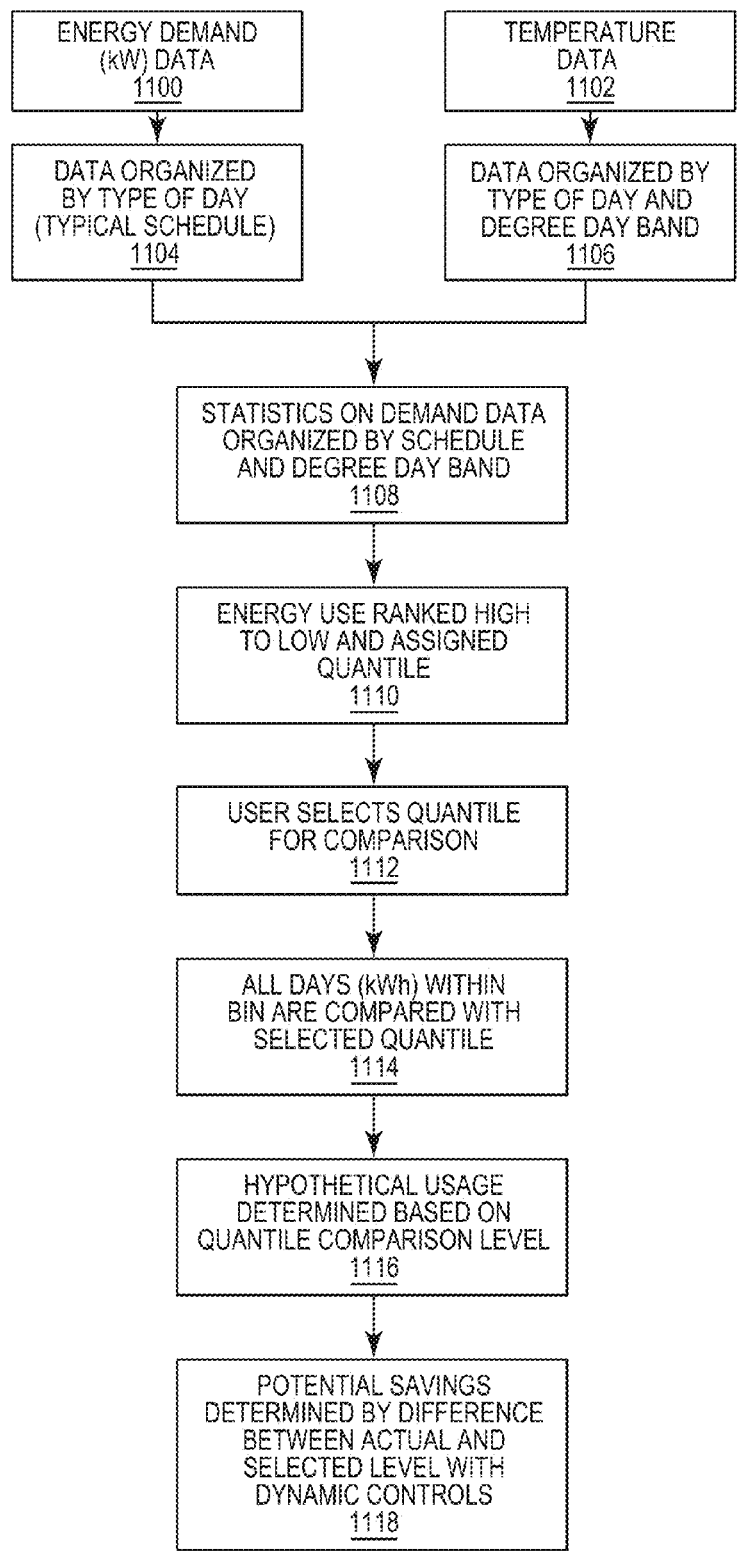
FIG. 11 is a flow chart of an example method for presenting cost and savings potential information according to embodiments of the present disclosure.

The analytics, simulation, forecasting and benchmarking tools 102 of the energy management DSS 100 shown in FIG. 1 may provide a tool for presenting cost and savings potential information. For example, FIG. 11 illustrates a flow chart of an example method for presenting cost and savings potential information according to embodiments of the present disclosure. Referring to FIG. 11, energy data (step 1100) and temperature data (step 1102) organized into multidimensional matrices (as per previous processes) are imported.

At step 1104 of FIG. 11, energy daily data may be organized into the four (4) schedules as mentioned in other benchmarking tool descriptions disclosed herein. At step 1106 of FIG. 11, daily degree days may also be organized by the four (4) schedules.

At step 1108 of FIG. 11, energy data may be organized by degree day bin based on the calculated degree days for each day within the date range and for each schedule. Basic statistics may be calculated for each schedule and sub-bin (e.g. min, max, median, mode, standard deviation, # of days in sub-bin, etc.). At step 1110 of FIG. 11, within each sub-bin (schedule, then degree day band), total daily energy use may be ranked from high to low and assigned a quantile. At step 1112, a user may dynamically select quantile for comparison. If the user wants to compare all days that fall within the sub-bins with the first decile, then that kWh may be selected as the comparison point. At step 1114, all days above kWh level selected in step 1112 above may be reduced to the quantile kWh level and all days with kWh below this level remain as is.

At step 1116 of FIG. 11, a "new" total kWh amount may be calculated based on the quantile. The point is that the building has performed at this level and if the building can reach that same level under similar conditions, then kWh could be reduced by the difference between what was actually consumed and the new quantile level. The purpose of using a statistical comparison point is, at the very least, to allow the opportunity to remove outliers that are not appropriate for comparison. For example, the Friday after Thanksgiving is typically one of the days (within the Tuesday-Friday schedule) with the lowest level of energy use. It may not be appropriate to compare all Tuesday-Fridays (at the degree day bin) with this level as it is essentially a holiday.

Figure 12:
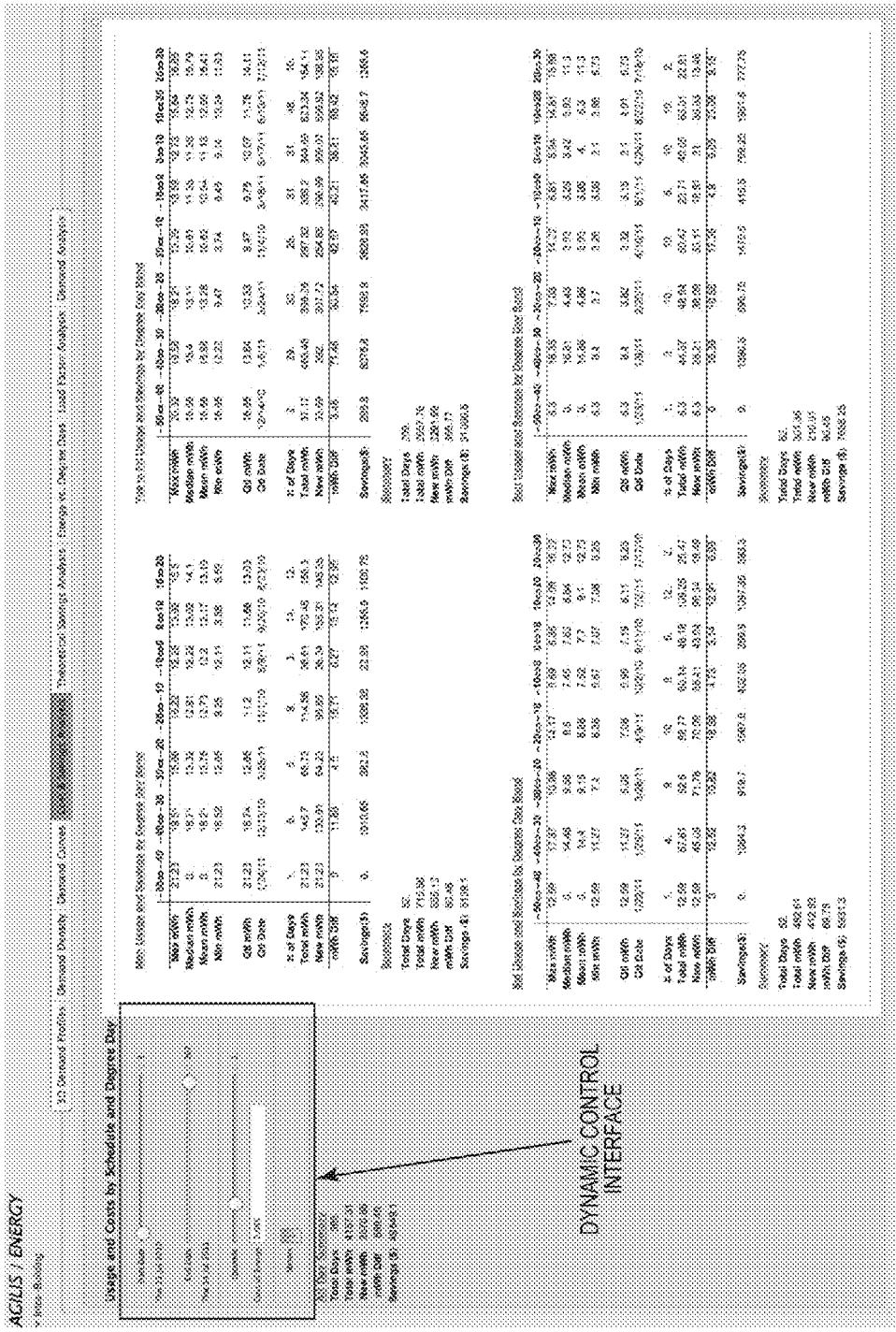
FIG. 12 is a screen display of a dynamic user interface and various comparison tables of such data in accordance with embodiments of the present disclosure.

At step 1118 of FIG. 11, the actual costs of energy per kWh may then be multiplied by the difference between actually used (as organized above) and the "new" kWh level to arrive at a potential savings at the defined quantile. This gives the client a perspective on the value of more disciplined performance either driven by changes to operation or equipment, reduced variability. FIG. 12 depicts a screen display of a dynamic user interface and various comparison tables of such data in accordance with embodiments of the present disclosure. The screen display of FIG. 12 also shows a dynamic control interface.

Theoretical Costs and Savings Tool

Figure 13:
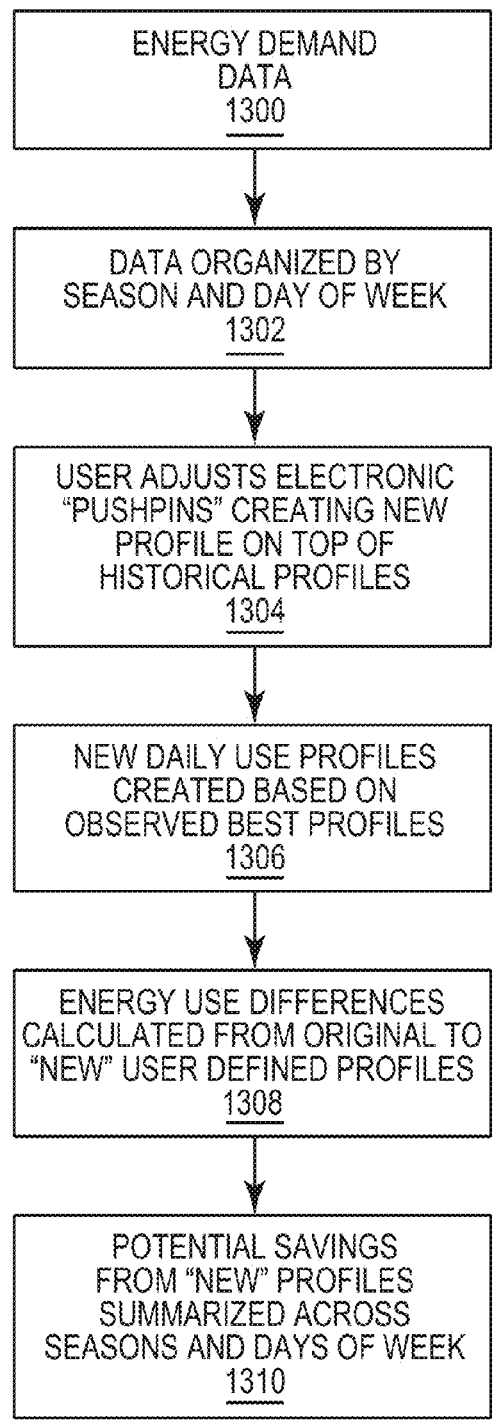
FIG. 13 is a flow chart of an example method for analyzing theoretical cost and savings potential information according to embodiments of the present disclosure.

The analytics, simulation, forecasting and benchmarking tools 102 of the energy management DSS 100 shown in FIG. 1 may provide a tool for presenting theoretical cost and savings potential information. For example, FIG. 13 illustrates a flow chart of an example method for analyzing theoretical cost and savings potential information according to embodiments of the present disclosure. Referring to FIG. 13, at step 1300, energy data organized into multidimensional matrices (as per previous processes) is imported. At step 1302 of FIG. 13, energy intra-day data is organized by season and into the four (4) operational schedules previously mentioned (i.e. Monday, Tuesdays-Fridays, Saturdays and Sundays).

At step 1304 of FIG. 13, the user may adjust electronic "pushpins" that result in new levels of comparison to historical demand profiles. Further, at step 1306, the dynamically adjusted "pushpins" create "new" profiles for each schedule and season for a total of 16 "new" profiles. High and low intraday curves are also created and the user can adjust the percentages the high and low curves are to be from the dynamically adjusted new curve. At step 1308 of FIG. 13, energy differences may be calculated from historic daily profiles from the newly created curve and the high and low curves. At step 1310 of FIG. 13, results may be summarized for the last 365 days by schedule and season showing the expected theoretical changes and high and low values.

Figure 14:
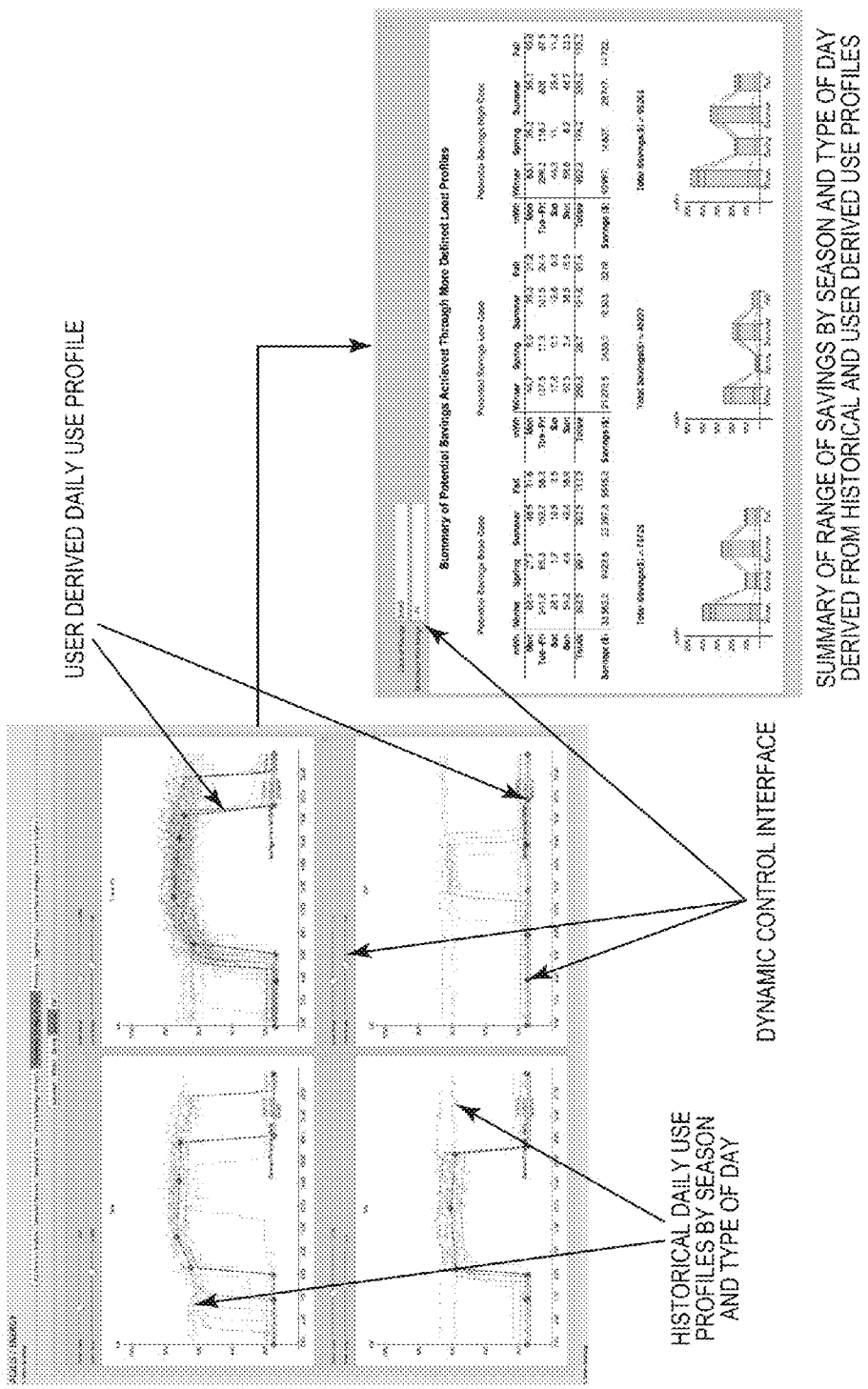
FIG. 14 depicts screen displays of a dynamic user interface, operational schedules by season and a summarization table of data in accordance with embodiments of the present disclosure.

FIG. 14 depicts screen displays of a dynamic user interface, operational schedules by season and a summarization table of data in accordance with embodiments of the present disclosure. Referring to FIG. 14, the screen displays show a user derived daily use profile, historical daily use profiles by season and type of day, and a summary of range of savings by season and type of day derived from historical and user derived use profiles. The screen display also show dynamic control interfaces.

Energy Usage versus Temperature Tool

Figure 15:
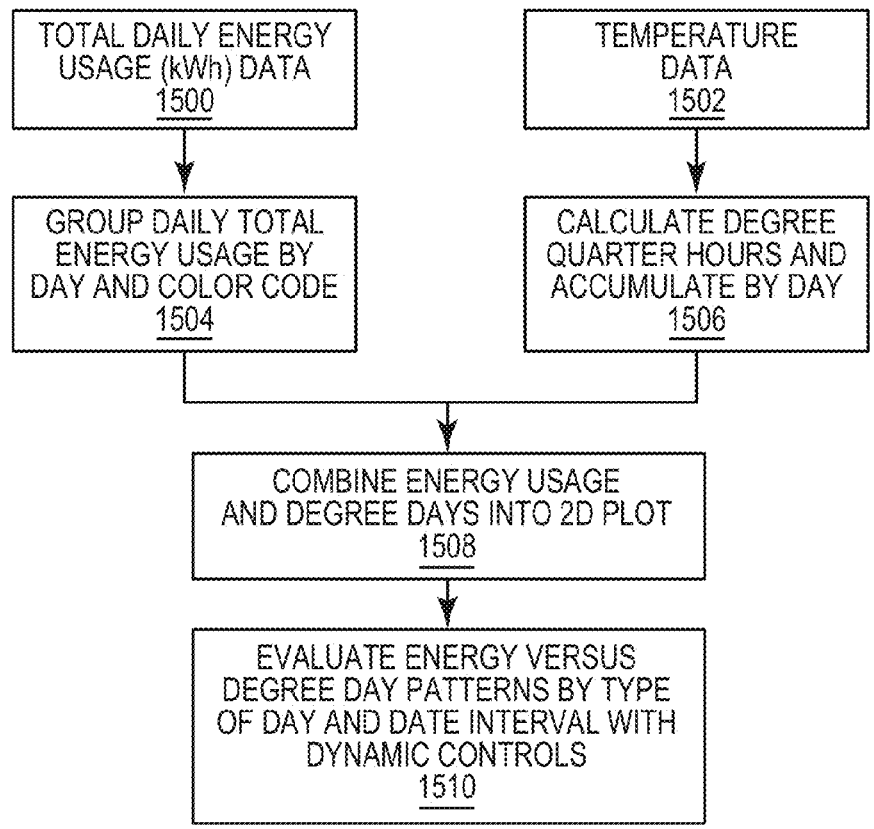
FIG. 15 is a flow chart of an example method for evaluating and determining the patterns between daily energy use by day of week and accumulated daily degree days.

The analytics, simulation, forecasting and benchmarking tools 102 of the energy management DSS 100 shown in FIG. 1 may provide a tool for presenting energy use patterns versus external weather conditions. For example, FIG. 15 illustrates a flow chart of an example method for evaluating and determining the patterns between daily energy use by day of week and accumulated daily degree days. Referring to FIG. 15, at step 1500, total energy use per day may be calculated from the smart meter interval data. At step 1502, temperature data may be selected that matches each of the individual days.

At step 1504 of FIG. 15, totaled daily energy is grouped by schedule (e.g. Monday, Tuesday-Friday, Saturday and Sunday) and color coded. At step 1506, total daily degree days are calculated for each day of the full date time interval.

At step 1508 of FIG. 15, daily energy use and daily degree days are combined and plotted on axes of energy versus degree days. Cooling degree days are to the right of the vertical axis and heating degree days are to the left of the vertical axis.

At step 1510 of FIG. 15, clear patterns of increasing and decreasing energy use as it relates to outside air temperature conditions can be viewed. Shapes (e.g. asymmetric "smiles") for each day of week schedule are expected. Substantial and predictable reductions in energy use when degree days are near the vertical axis are most common and desired. When distinct patterns are not visible, the building is not frequently operating as efficiently as possible and can be indications of improperly programmed building cooling and heating setpoints. In addition, large variances in energy use over narrow degree day ranges can indicate that the building does not consistently respond to similar day of week and outside weather conditions. These can be lead indicators (e.g. markers) of control system and/or internal sensor issues and improper electronic feedback mechanisms.

Figure 16:
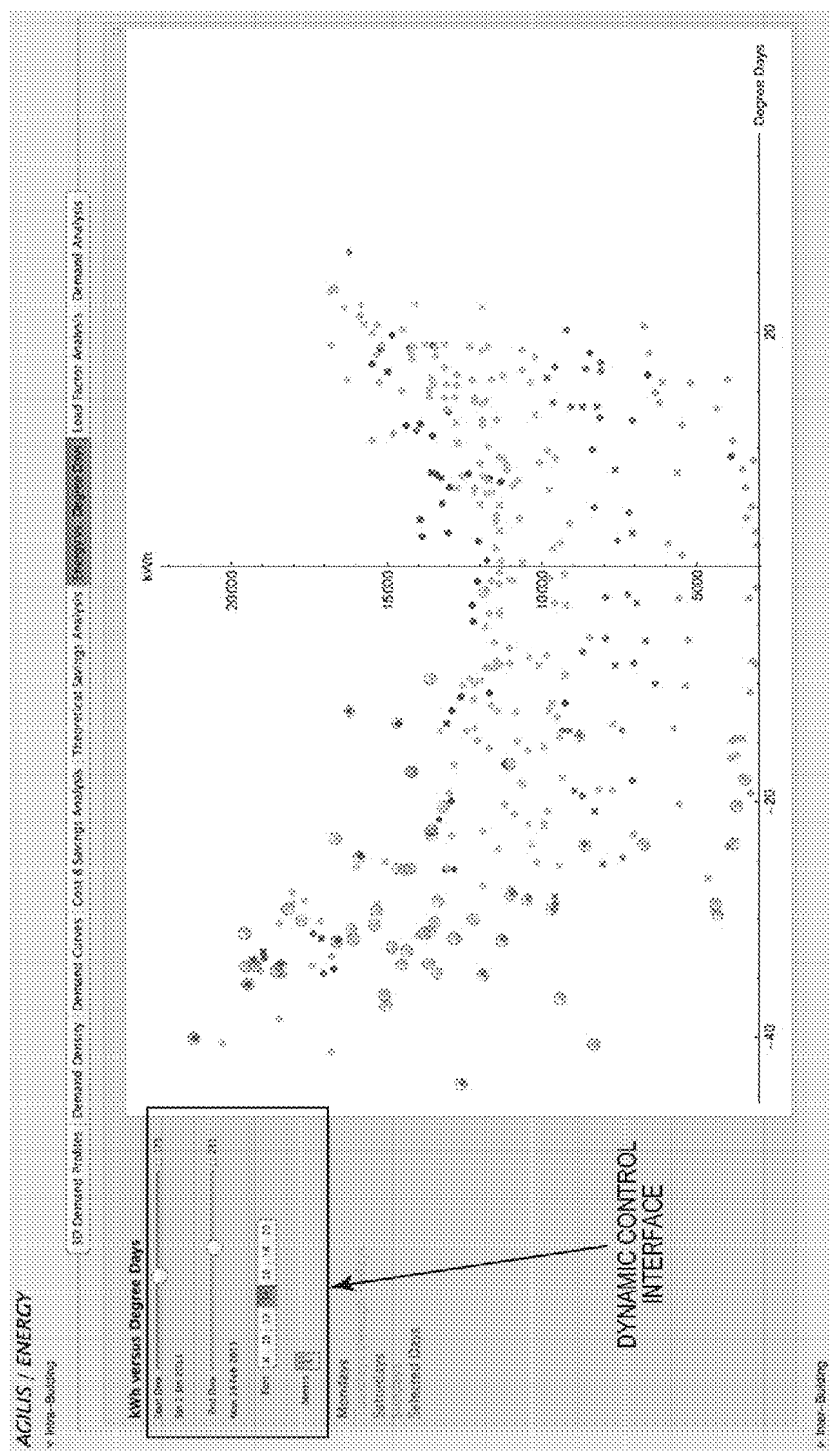
FIG. 16 is a screen display of a dynamic user interface and a 2D plot of energy use versus cooling and heating degree days in accordance with the embodiments of the present disclosure.

FIG. 16 depicts a screen display of a dynamic user interface and a 2D plot of energy use versus cooling and heating degree days. The time dimension is also combined in this 2D plot through the user control start and end date interval. These controls display red circles around each of the plotted points. In this way, the user can also understand patterns over defined time intervals. The screen display of FIG. 16 shows a dynamic control interface.

Capacity Utilization Tool

Figure 17:
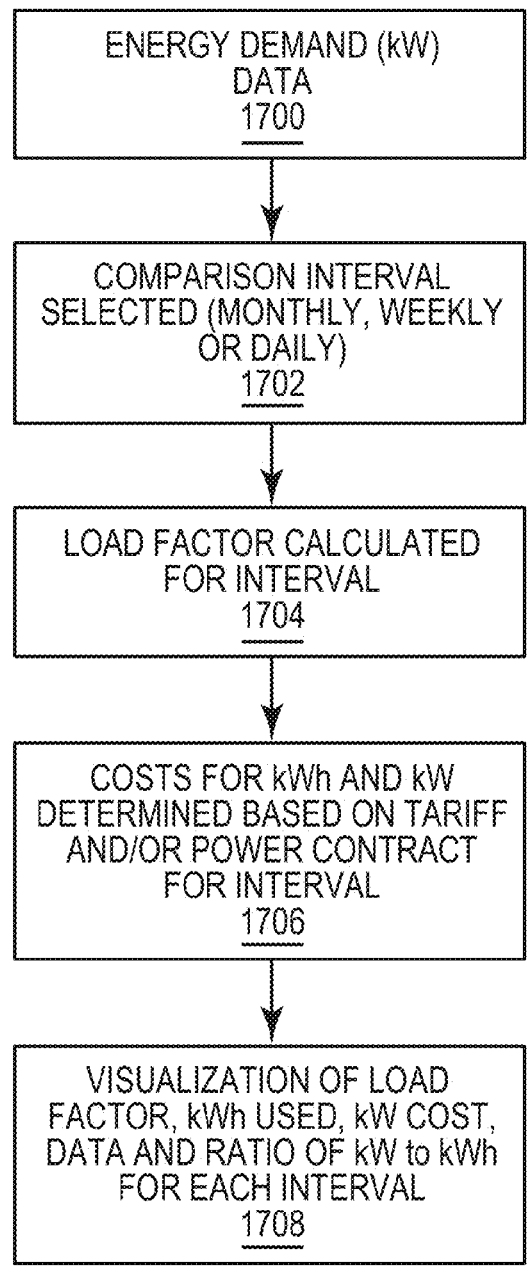
FIG. 17 is a flow chart of an example method for presenting capacity utilization information according to embodiments of the present disclosure.

The analytics, simulation, forecasting and benchmarking tools 102 of the energy management DSS 100 shown in FIG. 1 may provide a tool for presenting capacity utilization information. For example, FIG. 17 is a flow chart of an example method for presenting capacity utilization information according to embodiments of the present disclosure. Referring to FIG. 17, step 1700, energy and temperature data organized into multidimensional matrices (as per previous processes) is imported. At step 1702 of FIG. 17, a user may select a comparison interval which causes full range of data to be organized by month (28 days), weeks (7 days) or days.

At step 1704 of FIG. 17, a load factor may be calculated for each interval. For example, load factor may equal (actual kWh consumed)/(kWh that would have been consumed if operated at peak kW for entire interval). A load factor of 1 may indicate the same level of use (kWh) for every hour at a 24/7 manufacturing facility. A low load factor indicates that the load is not efficient in its use of power and may have spikes of high kW, but operates at much lower levels throughout the interval. This is important from a cost of power standpoint as the more "peaky" a load the higher the price due to the uncertainty of demand as viewed by the power supplier/utility.

At step 1706 of FIG. 17, costs for kWh and kW calculated for intervals based on actual power contract and regulated tariffs. Uniquely established for each building based on its physical location and regulated utility and, if in a competitive power market, the actual contract cost of power per kWh.

At step 1708 of FIG. 17, a dynamic user interface and 3D visualization created that for each interval may show various information. For example, the following information may be shown: load factor versus kWh consumed; load factor versus date; energy use (kWh) versus date; median levels for each of 3 dimensions for Load Factor, kWh and date; and total costs for power (kW and kWh) for each interval is represented by the size of the individual sphere. Using a mouse to move a cursor over the sphere shows the expected costs for kW and kWh for the period represented by the sphere. Other information shown may include a breakdown of costs for kW and kWh that shows how they interrelate over the different date intervals.

An example purpose of this tool is to provide insight into the efficiency of the building equipment usage and potential seasonality. Commercial office buildings typically have load factors between 50 and 55%. A too low load factor drives higher costs per kW, whereas a very high load factor indicates that too many kWh are being used, generally in off peak periods. Buildings and load factors typically follow a seasonal pattern so comparisons are also made with industry standards.

Figure 18:
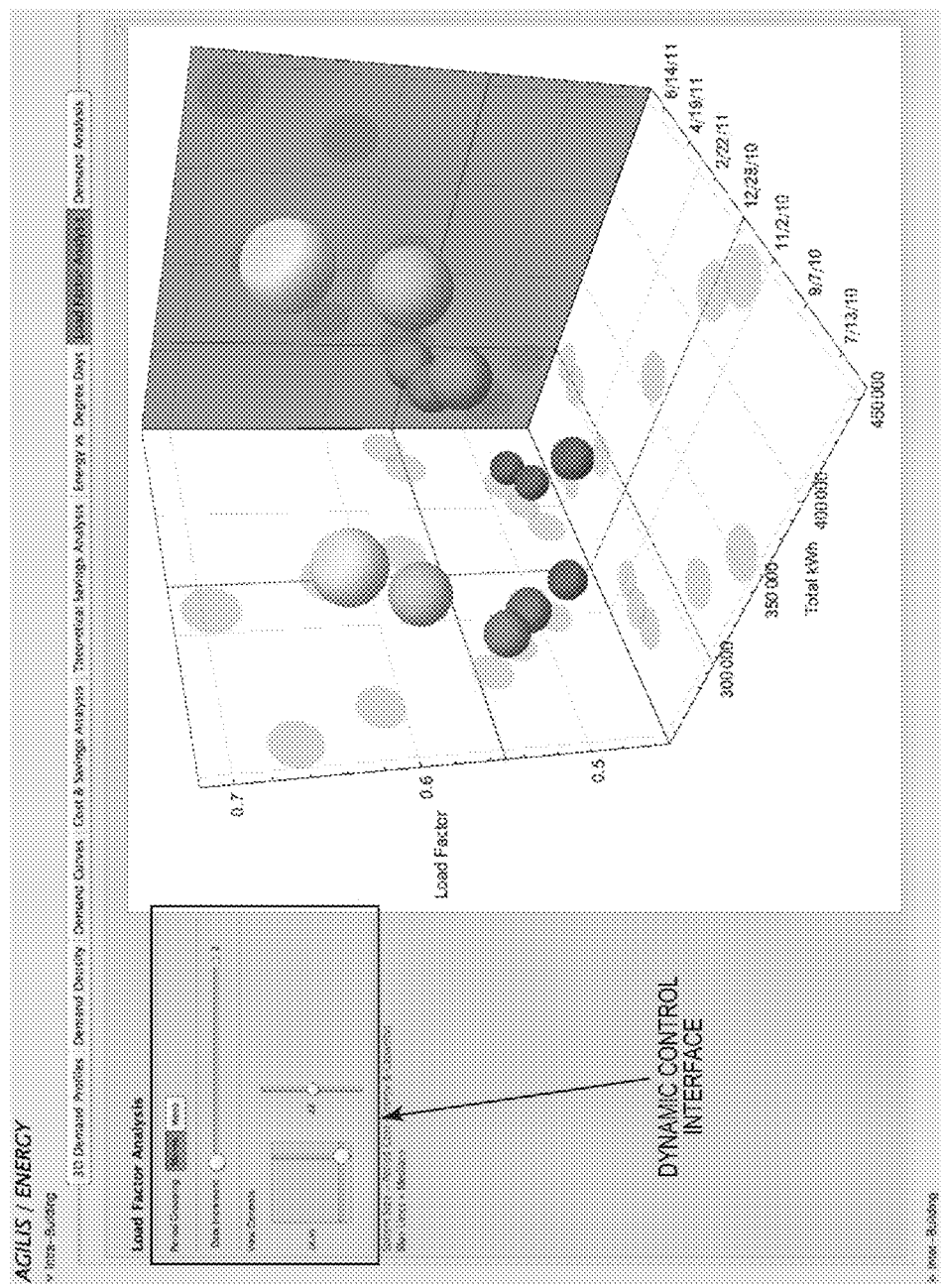
FIG. 18 is a screen display of a 3D visualization of load factor versus total energy versus time in accordance with embodiments of the present disclosure.

FIG. 18 depicts a screen display of a 3D visualization of load factor versus total energy versus time in accordance with embodiments of the present disclosure. The screen display also shows a dynamic control interface.

Demand Management Analysis Tool

Figure 19:
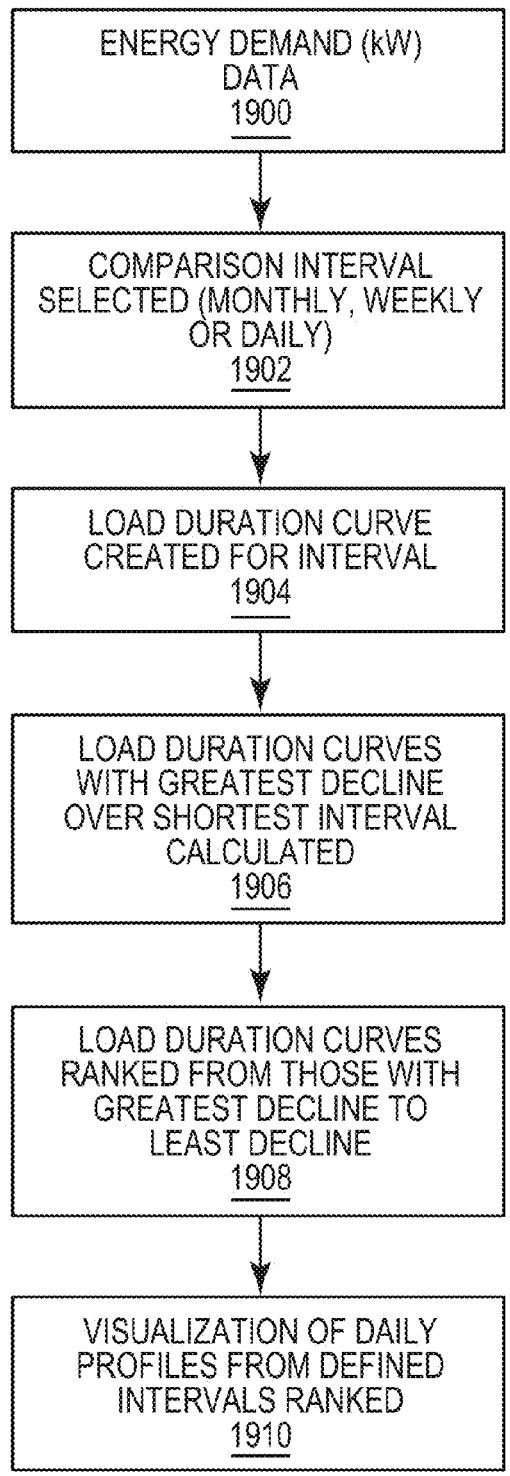
FIG. 19 is a flow chart of an example method for demand management analysis according to embodiments of the present disclosure.

The analytics, simulation, forecasting and benchmarking tools 102 of the energy management DSS 100 shown in FIG. 1 may provide a tool for demand management analysis. For example, FIG. 19 is a flow chart of an example method for demand management analysis according to embodiments of the present disclosure. Referring to FIG. 19, at step 1900, energy data organized into multidimensional matrices (as per previous processes) may be imported. At step 1902 of FIG. 19, a user may select a time interval (e.g., monthly, weekly or daily).

At step 1904 of FIG. 19, a load duration curve may be created for each interval over the full date range. Particularly, for example, a load duration curve may organize the demand levels (kW) into bins (high to low) and then a percentage of the total period is determine by which the load is at or above the bin. Further, for example, a particular building might for 100% of the defined interval be above 300 kW, but for 1% of the interval it is at or above 1,000 kW. A curve may be created that shows these characteristics for the interval.

At step 1906 of FIG. 19, a subinterval may be selected by the user (e.g. 2%) where the first derivative is calculated over this subinterval to determine the rate of decline from the highest levels of demand (kW) use.

At step 1908 of FIG. 19, the load duration curves may be ranked based on those curves (intervals) with the greatest decline over the shortest interval. The steepest decline may represent the interval that was the "peakiest" for the shortest period of time. Short lived peaks may identify opportunities for more enhanced load (kW) management that have direct (and usually large) cost reduction potential for tariffs and competitive power contracts.

Figure 20:
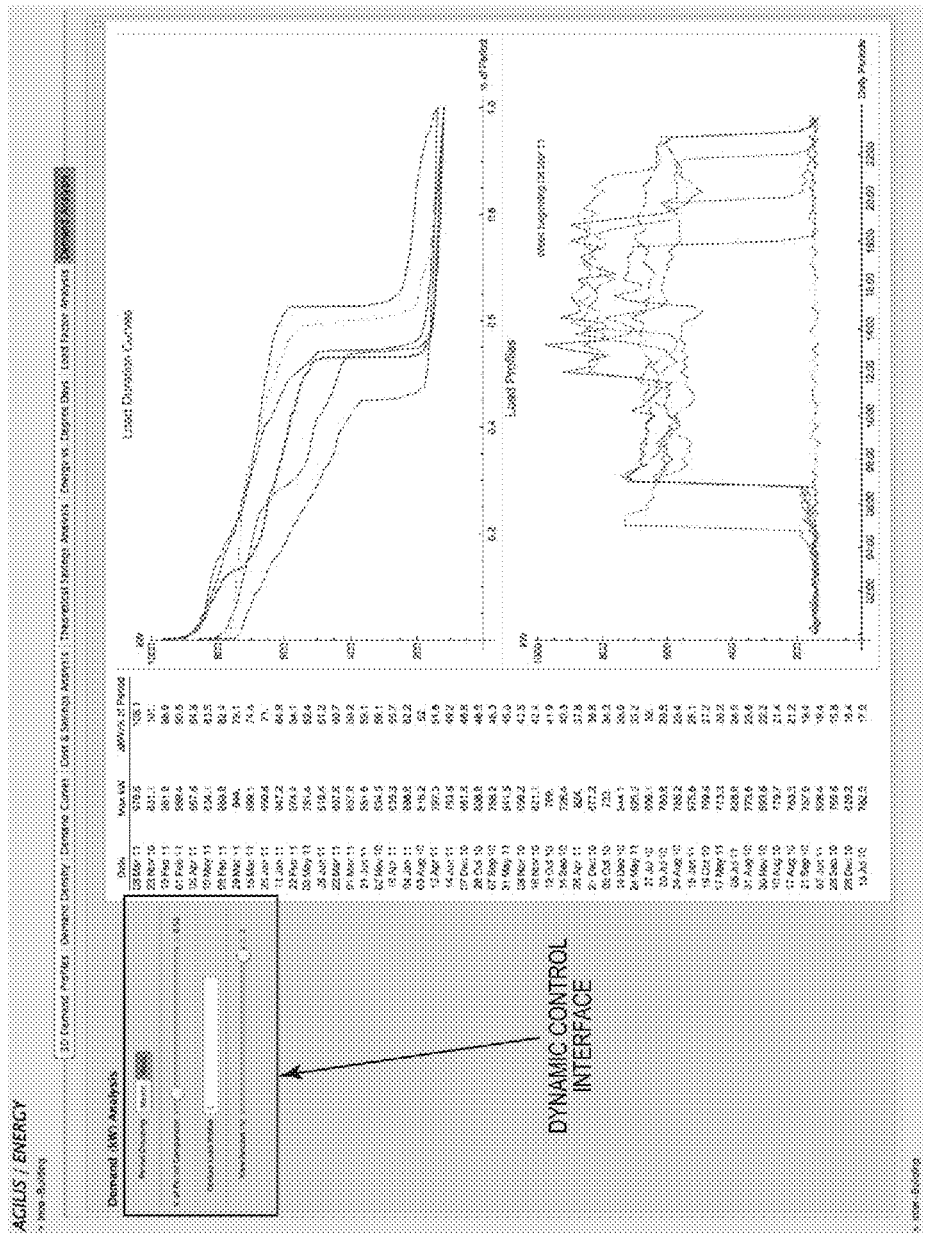
FIG. 20 is a screen display of a dynamic user interface and visualization that provides for demand analysis in accordance with embodiments of the present disclosure.

At step 1910 of FIG. 19, a visualization may be created that shows the actual daily profiles for selected interval based on the above rank. For example, FIG. 20 depicts a screen display a dynamic user interface and visualization provides for demand analysis in accordance with embodiments of the present disclosure. Peaky patterns (and when they occurred) are clearly identified. The screen display of FIG. 20 shows a dynamic user interface.

Inter-building Evaluation Tools

Figure 21:
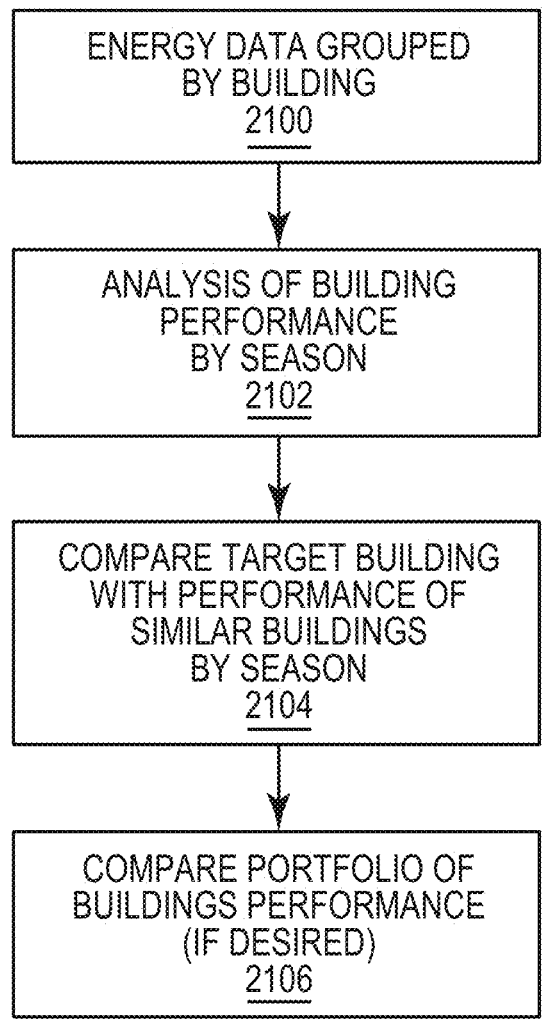
FIG. 21 is a flow chart of an example method for inter-building benchmarking across similar type buildings according to embodiments of the present disclosure.

The analytics, simulation, forecasting and benchmarking tools 102 of the energy management DSS 100 shown in FIG. 1 may provide a tool for presenting building performance statistics allowing for inter-building benchmarking comparison of similar types of buildings across key measures. While other building analytical and visualization tools presented in this application compare the building against itself (e.g. intra-building benchmarking), substantial insight can be gained into the magnitude of identified issues through comparisons with other buildings. FIG. 21 is a flow chart of an example method for inter building benchmarking across similar type buildings according to embodiments of the present disclosure. Referring to FIG. 21, step 2100, energy data is grouped by building. At step 2102, individual building data is grouped by season and key normalized analysis performed. Normalization is important to allow for differences in building size to be minimized and appropriate comparisons made.

At step 2104 of FIG. 21, building performance is compared with other similar buildings in a distribution plot also showing the mean values and +1 standard deviation and −1 standard deviation. All other similar buildings in the database are shown in blue and only identified by number and value. An individual (targeted) building is defined by the user and shown in red. The plots are grouped by season lessening the effects of seasonal temperature changes.

Figure 22:
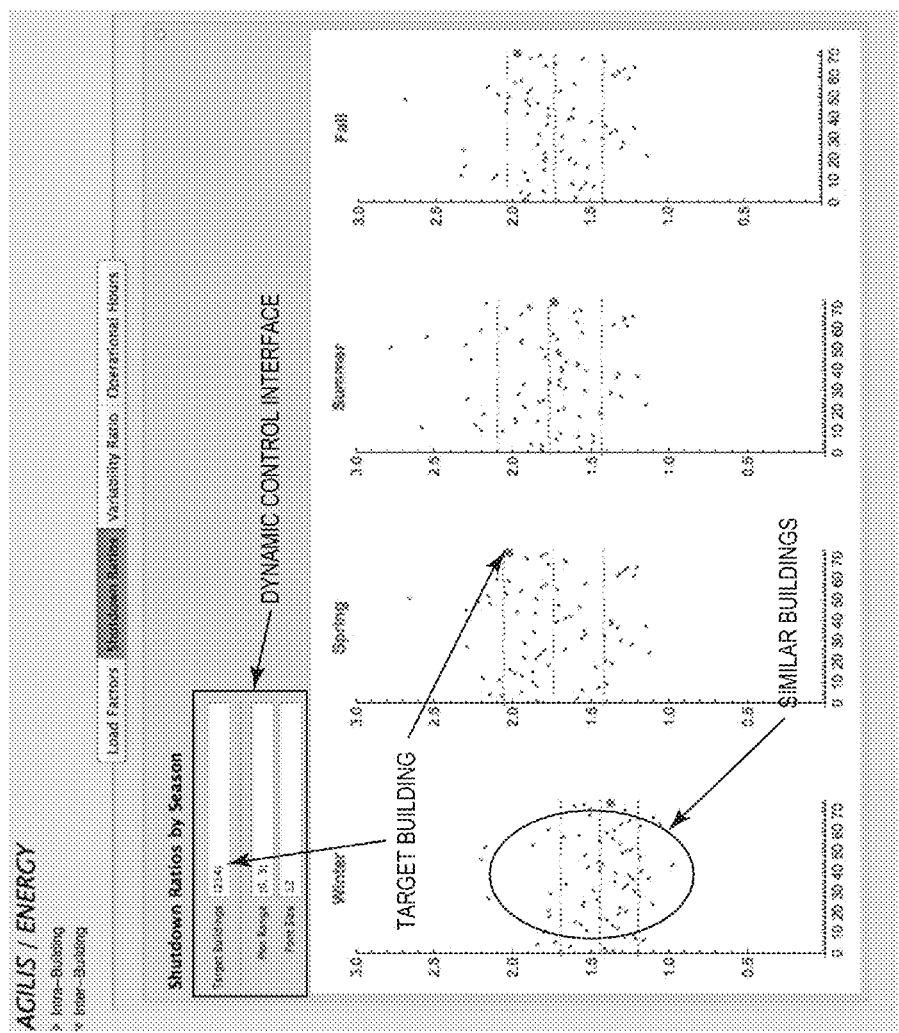
FIG. 22 is a screen display showing a dynamic user interface and visualization for inter-building benchmarking and issue identification across key measures according to embodiments of the present disclosure.

At step 2106 of FIG. 21, the user may define a broader range of buildings to compare by inputting the building numbers. This will allow for a user with more than one building to evaluate their performance against the portfolio and other buildings in the broader database. For example, FIG. 22 depicts a screen display showing a dynamic user interface and visualization for inter-building benchmarking and issue identification across key measures.

Virtual Building Tools

System and method embodiments are disclosed that provide virtual building tools for use in modeling of an actual building and associated predicted building energy usage. For example, a suitable computer may include an application configured to model the building and predicted building energy usage. The method may also include receiving data indicating actual building energy usage and weather associated with the actual building energy usage for the actual building. Further, the method may include determining variances between the actual building energy usage and predicted building energy usage. The model may be used to simulate changes to building operation and/or building equipment of the actual building based on the variances for determining a probability adjusted outcome of building energy used and costs. The method may also include presenting to a user the probability adjusted outcome of building energy used and costs of changing the building operation and/or building equipment.

Figure 23:
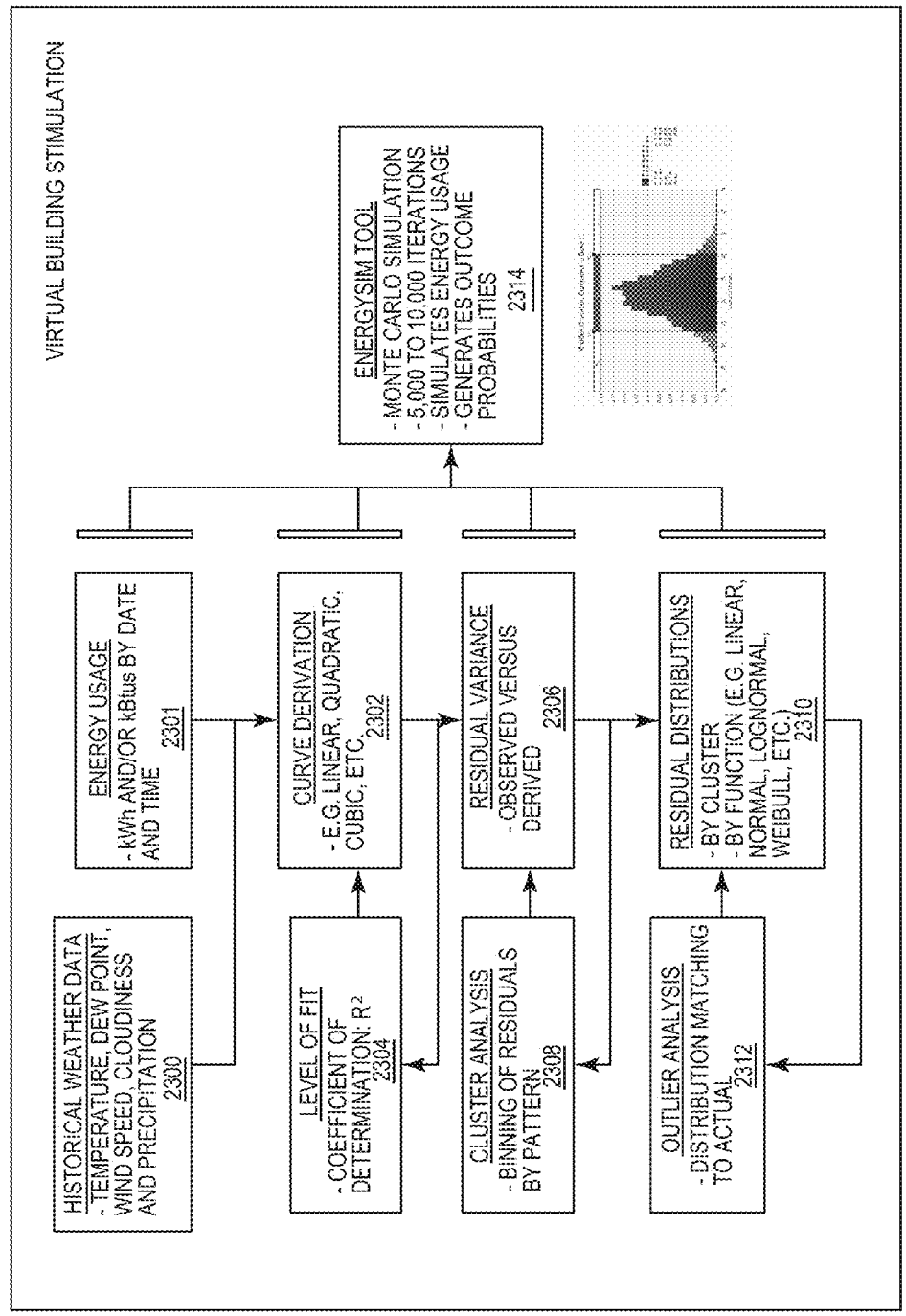
FIG. 23 is a flow chart illustrating an example method that may be implemented by a virtual building tool according to embodiments of the present disclosure.

FIG. 23 is a flow chart illustrating an example method that may be implemented by a virtual building tool according to embodiments of the present disclosure. The method may be implemented by the virtual building tool 102 of the system 100 shown in FIG. 1. Referring to FIG. 23, at steps 2300 and 2301, energy and temperature data organized into multidimensional matrices (as per previous processes) may be imported.

At step 2302 of FIG. 23, energy functional curves may be created for periods (months, seasons, and/or degree day levels) where there is a distinct change in building response to ambient air temperature. At step 2304, the functional curves, derived from actual data, may then be evaluated against a level of fit methodology to determine if the type of curve accurately represents the building's behavior.

At step 2306 of FIG. 23, variances between actual energy use and the derived and predicted value may be determined. The variances may be evaluated and clustered in order to more accurately account for variances (step 2308). Subsequently, the distributions of the variances may then be calculated (e.g. linear, normal, lognormal, etc.) (step 2310) and outliers evaluated (step 2312). Extreme outliers may be removed from the analysis and/or drive adjustments to the distribution bounds (step 2310).

At step 2314 of FIG. 23, with multiple functions, defined over data driven intervals (could vary significantly from building to building), probability distributions of the variances between actual and derived, a Monte Carlo simulation may be conducted that simulates the building behavior over a historically driven range of temperatures. The result may be a distribution of total kWh that could be expected based on the variability of the actual building to ambient air temperature. Costs per kWh are then applied to determine range of energy costs.

With a base virtual building "created", adjustment can then be made to the functions and variance distributions based on potential changes to the building operation and/or equipment upgrades/retrofits and their stated impact (as provided by the vendors) and multiple simulation runs conducted to determine a probability adjusted outcome of kWh used and costs. This type of simulation then allows for a ranking of individual capital projects by risk (greater to lower variability).

Figure 24:
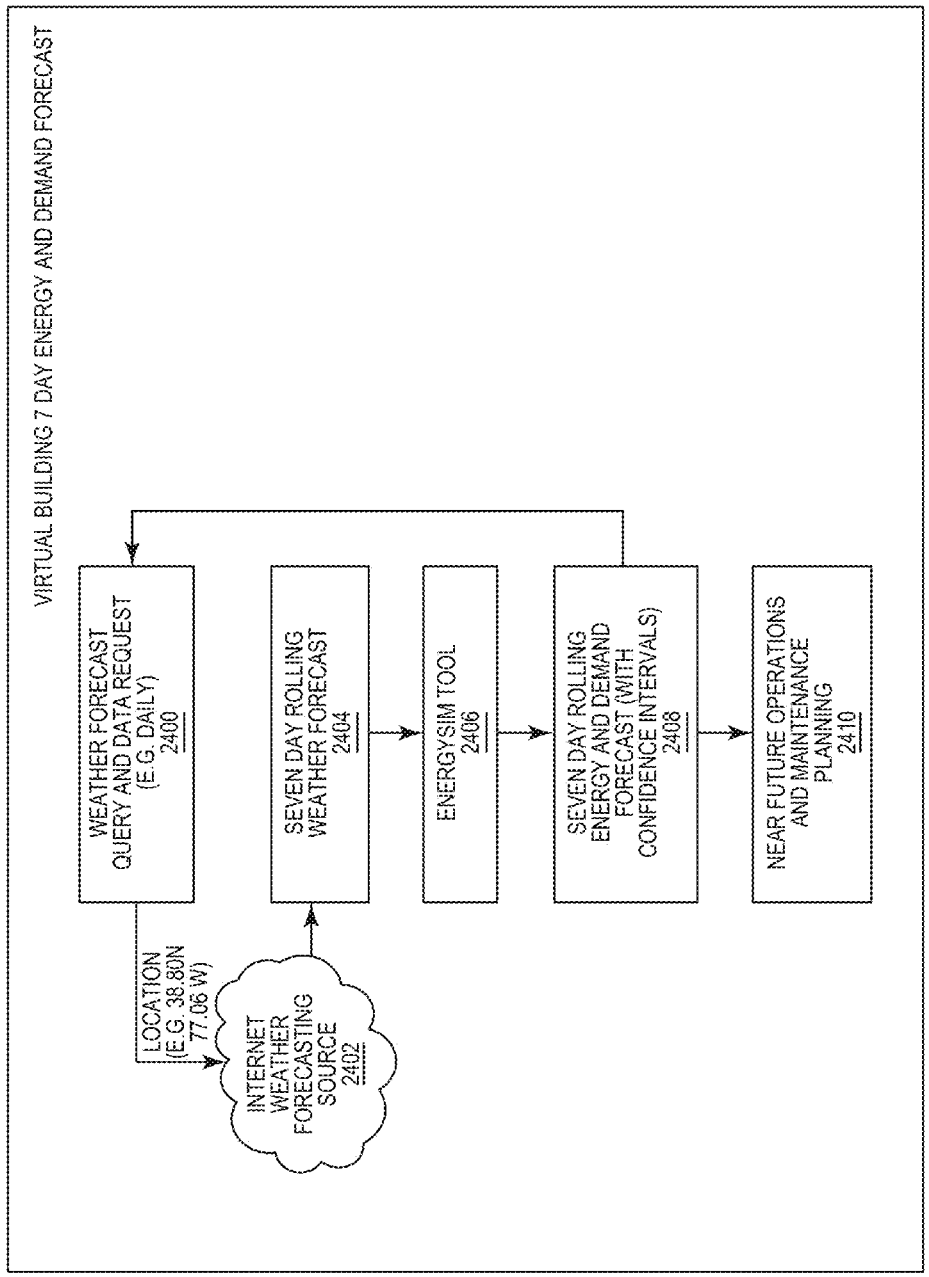
FIG. 24 is a flow chart of an example method that may be implemented by using a virtual building simulation tool and weather forecast data to create a multi-day energy forecast according to embodiments of the present disclosure.

The virtual building mentioned according to embodiments of the present disclosure, can also be used to derive a "rolling" demand and energy forecast for the building as illustrated in the flow chart FIG. 24. The same algorithms and methods used to create the virtual building tool can be applied with discrete weather parameters presented in a, for example, 7 day weather forecast from the National Weather Service or other such meteorological prediction service. Referring to FIG. 24, at step 2400, the extended term (e.g. typically 7 day) weather forecast is electronically requested automatically through an application programming interface (e.g. api) for a building's latitude and longitude. A range of available weather parameters is requested. The forecast may be requested from an Internet weather forecasting source 2402.

At step 2404 of FIG. 24, an electronic 7 day extended weather forecast is received with predication points of greater frequency for the nearest upcoming days and less frequency for the days at the end of the extended forecast. The data is organized by date and parameter (e.g. temperature, dew point temperature, wind speed and sunniness/cloudiness). Note that building memory is accounted for by time shifting the data to allow for the impact of a "string" of warm or cold days.

At step 2406 of FIG. 24, the most relevant weather information depending on type of day and seasonal period in imported into the building simulation tool (e.g. EnergySim 2314), as described in FIG. 23, and energy and demand predictions are made for each of the days of the extended weather forecast in step 4 of FIG. 24. Confidence intervals are also created that show the expected range of energy and demand by day.

At step 2408 of FIG. 24, the forecast of energy, demand and confidence intervals is used to proactively approach the upcoming 7 day operational schedule regarding preventative and planned maintenance. Building administrators can also consider adjusting programmed setpoints depending on the 7 day forecast to achieve lower energy and demand use. Predicted days with wide confidence levels can be flagged and drive greater administrator focus to ensure the best possible result (e.g. lowest energy and demand use). The user can utilize this information for near future operations and maintenance planning (step 2410).

Implementation of System and Method Embodiments

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for assessing performance of a building and for providing an operation and financial decision support system, the method comprising:
 receiving intra-day time-based energy use, weather, cost, and operations data associated with the building for a set of days, weeks, months or years, wherein the data is received at least two times per day;
 analyzing via a computer the data for consistency and continuity across the intra-day and multi-day intervals;
 generating via the computer time-based polynomial equations for each day derived from observed intra-day weather data;
 creating via the computer a complete data set by matching the interval energy data and interpolated weather data derived from the time-based polynomial equations;
 performing via the computer multiple, dynamic matrixed data processes in a visual, multi-dimensional environment;
 identifying and prioritizing by cost and frequency, operational periods, weather conditions, and equipment and controls configurations that result in inefficient and costly operations;
 generating via the computer a dynamic, decision support system that through multi-variate and relational visualization and an interactive, user-controlled feedback interface supports decision making to reduce energy costs from patterns of suboptimal performance based on the data and the building model; and
 presenting via the computer to an operator at least one recommendation based on the data, the decision support system, and the building model for improving building performance through one or more actions.

2. The method of claim 1, wherein receiving energy use data comprises receiving energy use data from one or more advanced interval data recorder meters at defined intra-day time increments.

3. The method of claim 1, wherein receiving weather data comprises receiving interval weather data that matches a time interval corresponding to the energy use data.

4. The method of claim 1, wherein analyzing the data comprises comparing the data to a generated schedule of dates and times and flagging missing interval data and duplicates for evaluating the data for completeness.

5. The method of claim 1, wherein analyzing the data comprises supplementing missing data with localized date and time data measurements or from alternative Internet-based sources.

6. The method of claim 1, wherein analyzing the data comprises generating a series of daily polynomials of weather versus time based on actual observed daily measurements.

7. The method of claim 1, wherein analyzing the data comprises interpolating daily polynomials to match interval energy use data for creating a complete set of energy and weather data.

8. The method of claim 1, wherein performing multiple, dynamic matrixed data processes comprises combining multi-variate data into a dynamic visualization format for use in identifying periods of non-standard energy use across one or a time of day, day of week, month, season and year when compared with similar periods and normalized by weather parameters.

9. The method of claim 1, further comprising receiving user input into the interface for changing and evaluating different time periods.

10. The method of claim 1, further comprising ranking date and time periods associated with energy use and weather based on cost and efficiency.

11. The method of claim 1, further comprising determining potential causes of poor performance based on one or more of visualization feedback, building requirements, and physical configuration.

12. The method of claim 1, further comprising using the interface to receive user input for dynamically controlling and adjusting time and date periods to display performance and cost in comparison to other similar periods.

13. A system for assessing performance of a building and for providing an operation and financial decision support system, the system comprising;
 at least a processor and memory configured to:
 receive intra-day time-based energy use, weather, cost, and operations data associated with the building for a set of days, weeks, months or years, wherein the data is received at least two times per day;
 analyze the data for consistency and continuity across the intra-day and multi-day intervals;
 generate time-based polynomial equations for each day derived from observed intra-day weather data;
 create a complete data set of matched interval energy data and interpolated weather data from the time-based polynomial equations;
 perform multiple, dynamic matrixed data processes in a visual, multi-dimensional environment;
 identify and prioritize by cost and frequency, operational periods, weather conditions, and equipment and controls configurations that result in inefficient and costly operations;
 generate a dynamic, decision support system that through multi-variate and relational visualization and an interactive, user-controlled feedback interface supports decision making to reduce energy costs from patterns of suboptimal performance based on the data and the building model; and
 present to an operator at least one recommendation based on the data, the decision support system and the building model for improving building performance through one or more actions.

14. A method for simulating energy use associated with a building to test one or more actions for implementation by an operator in order to test the economic effects of changes to proposed building operations and capital equipment investment, the method comprising:
 generating via a computer derived polynomial equations using time-based forecast data grouped by clustering techniques for meeting a fit and minimal variance criteria, wherein the time-based forecast data is received at least two times per day for a set of days, weeks, months or years;
 determining via the computer a statistical distribution of residual variance from observed conditions for each derived polynomial equation;
 estimating via the computer static efficiency and performance improvement effects from changes to one of operations and equipment of a building model;

incorporating via the computer proposed building operations and equipment change estimates into a simulation process using the derived polynomial equations and residual variance distributions;

comparing economic range of the effects and risk of proposed changes to equipment investment in a building associated with the building model;

presenting to an operator prioritized investment recommendations in a visual, multi-dimensional environment to; and identifying and prioritizing by cost and frequency, operational periods, weather conditions, and equipment and controls configurations based on economic returns and resultant variability risk data produced by the simulation process.

15. The method of claim 14, wherein generating derived polynomial equations comprises selecting key energy and weather interval data to evaluate and use in a prediction methodology.

16. The method of claim 14, wherein generating derived polynomial equations comprises grouping key energy and weather data into clusters based on mathematical equations for separating periods of distinctly different energy, date, time and weather relationships.

17. The method of claim 14, wherein generating derived polynomial equations comprises generating the polynomial equations that are determined to meet a criteria for representing the energy, date, time and weather relationships using a mathematical fit function.

18. The method of claim 14, wherein determining a statistical distribution of residual variance comprises generating a statistical distribution of historical variance to each clustered data derived polynomial set.

19. The method of claim 14, wherein estimating static efficiency comprises estimating discrete efficiency and performance improvement effects based on changes to one or more of operations and equipment.

20. The method of claim 14, wherein estimating static efficiency comprises converting static efficiency and performance improvement expectations to dynamic response based on one or more of changing weather, date, and time externalities.

21. The method of claim 14, wherein incorporating proposed building operations and equipment change estimates comprises using cluster derived polynomials, cluster variance distributions and historical combinations, and ranges of weather and energy use for providing a range of outcomes based on Monte Carlo simulation techniques.

22. A system for simulating energy use associated with a building to test one or more actions for implementation by an operator in order to test the economic effects of changes to proposed building operations and capital equipment investment, the system comprising:

at least a processor and memory configured to:

generate derived polynomial equations using time-based forecast data grouped by clustering techniques for meeting a fit and minimal variance criteria, wherein the time-based forecast data is received at least two times per day for a set of days, weeks, months or years;

determine a statistical distribution of residual variance from observed conditions for each derived polynomial equation;

estimate static efficiency and performance improvement effects from changes to one of operations and equipment of a building model;

incorporate proposed building operations and equipment change estimates into a simulation process using the derived polynomial equations and residual variance distributions;

compare economic range of the effects and risk of proposed changes to equipment investment in a building associated with the building model;

present to an operator prioritized investment recommendations in a visual, multi-dimensional environment to; and identify and prioritize by cost and frequency, operational periods, weather conditions, and equipment and controls configurations based on economic returns and resultant variability risk data produced by the simulation process.

* * * * *